United States Patent
Lescourret

(10) Patent No.: US 10,132,636 B2
(45) Date of Patent: Nov. 20, 2018

(54) HYBRID INERTIAL/MAGNETIC SYSTEM FOR DETERMINING THE POSITION AND ORIENTATION OF A MOBILE BODY

(71) Applicant: TDM, Merignac (FR)

(72) Inventor: Jean-Louis Lescourret, Merignac (FR)

(73) Assignee: TDM, Merignac (FR)

( * ) Notice: Subject to any disclaimer, the term of this patent is extended or adjusted under 35 U.S.C. 154(b) by 198 days.

(21) Appl. No.: 15/034,624

(22) PCT Filed: Nov. 6, 2014

(86) PCT No.: PCT/FR2014/052843
§ 371 (c)(1),
(2) Date: Aug. 16, 2016

(87) PCT Pub. No.: WO2015/067903
PCT Pub. Date: May 14, 2015

(65) Prior Publication Data
US 2016/0356601 A1   Dec. 8, 2016

(30) Foreign Application Priority Data
Nov. 6, 2013   (FR) ..................... 13 02566

(51) Int. Cl.
  *G01C 21/16*   (2006.01)
  *F41G 3/22*    (2006.01)
(52) U.S. Cl.
  CPC ........... *G01C 21/165* (2013.01); *F41G 3/225* (2013.01)
(58) Field of Classification Search
  CPC ....... F41G 3/225; G01C 21/165; G01C 21/30; G01S 19/26; G01S 19/46
  See application file for complete search history.

(56) References Cited

U.S. PATENT DOCUMENTS

| 4,287,809 A | 9/1981 | Werner |
| 5,646,525 A | 7/1997 | Gilboa |

(Continued)

FOREIGN PATENT DOCUMENTS

FR   2807831 A1   10/2001

OTHER PUBLICATIONS

International Preliminary Report on Patentability for International Application No. PCT/FR2014/052843 dated May 10, 2016, 22 pages with translation.

(Continued)

*Primary Examiner* — Bryan Bui
(74) *Attorney, Agent, or Firm* — TraskBritt

(57) ABSTRACT

The present invention concerns a system for contactless determination of the position and orientation of a first mobile object (M) relative to a reference mark ($R_P$) carried by a second fixed or mobile object (P), in a disturbed electromagnetic environment comprising a transmitting antenna (E) with ferromagnetic cores (E-1) having magnetic permeability higher than 10, incorporating sensors (E-3) for measuring the magnetic field $X_u$ actually emitted by the axes of the ferromagnetic cores. A means (4-4) for extracting the signal correlated with the ambient noise $X_{BR}$ ($T_k$–$K_b T_e$)— from the sensors (Sb) fixed in the platform (P), forms, with measurement $X_u$ of the emitted magnetic induction, a complete model of the measured fields, making it possible to extract, without errors, the six parameters relative to the field model without disturbances.

12 Claims, 14 Drawing Sheets

(56) References Cited

U.S. PATENT DOCUMENTS

| | | | |
|---|---|---|---|
| 6,172,499 B1 | 1/2001 | Ashe | |
| 6,292,750 B1 * | 9/2001 | Lin | G01C 21/165 |
| | | | 342/357.27 |
| 6,400,139 B1 | 6/2002 | Khalfin et al. | |
| 6,754,609 B2 | 6/2004 | Lescourret | |
| 7,640,106 B1 | 12/2009 | Stokar et al. | |
| 2014/0288820 A1 * | 9/2014 | Opshaug | G01C 21/30 |
| | | | 701/412 |

OTHER PUBLICATIONS

International Search Report for International Application No. PCT/FR2014/052843 dated Feb. 12, 2015, 3 pages.

International Written Opinion for International Application No. PCT/FR2014/052843 dated Feb. 12, 2015, 9 pages.

\* cited by examiner

Formation of an axis E1 of the transmitter

Examples of embodiment of transmission axes

Non-concentric three-axis transmitter

Bars assembled according to FIG. 7 windings

Concentric three-axis transmitters

Transmitter with core: Block consisting of interlocked sub-blocks

Front view according to B-B

Front view according to A-A

Control of the Continuous Field at Zero

Temporal Transmission Diagrams

Hybrid Tracker

HYBRID INERTIAL/MAGNETIC SYSTEM FOR DETERMINING THE POSITION AND ORIENTATION OF A MOBILE BODY

CROSS-REFERENCE TO RELATED APPLICATIONS

This application is a national phase entry under 35 U.S.C. § 371 of International Patent Application PCT/FR2014/052843, filed Nov. 6, 2014, designating the United States of America and published as International Patent Publication WO 2015/067903 A1 on May 14, 2015, which claims the benefit under Article 8 of the Patent Cooperation Treaty to French Patent Application Serial No. 1302566, filed Nov. 6, 2013.

TECHNICAL FIELD

The field of the invention is the measurement of the position and orientation of a mobile body M, which moves in translation and rotation relative to a reference mark connected to a fixed or mobile structure P relative to an inertial reference frame fixed-type reference mark. In particular, the invention concerns the determination of the position and orientation (P/O) of the helmet of a pilot in the reference mark of an aircraft, P/O from which the angular position of an external target is determined in the same mark by sight through a system including the helmet-mounted display of the pilot. In a known manner, the pilot superimposes on the external target the image of a collimated cross projected on the transparent visor thereof, and acquires the measurement taken by the device by pressing on a push-button.

More specifically, concerning the devices for determining the P/O, called "trackers of magnetic technology," the main problem of determining the position and orientation of a mobile body relative to a reference mark connected to a fixed or mobile structure having to be accurately determined comes from an electromagnetic environment significantly disturbed by radiated magnetic fields ("EMI" for Electromagnetic Interferences, "ECI" for Eddy Current Interferences or fields due to Eddy currents) and/or magnetic fields induced by ferromagnetic bodies ("FMI" for FerroMagnetic Interferences), environments such as the cockpits of aircraft and, more specifically, of helicopters, surgical operating rooms, etc. Thus, the accuracy is significantly degraded in the presence of the interferences. Therefore, the problem consists of finding the means to improve the performances despite the disturbances.

BACKGROUND

U.S. Pat. No. 7,640,106 is known in prior art describing an apparatus for determining the position of a selected object relative to a moving reference image, the apparatus including at least one reference frame transceiver assembly secured to the moving reference frame, at least one object transceiver assembly firmly attached to the selected object, an inertial measurement unit firmly attached to the selected object, an inertial navigation system ("INS") secured to the moving reference image, and a tracking processor coupled with the object transceiver assembly, to the inertial measurement unit and to the inertial navigation system, the object transceiver assembly communicating with the reference frame transceiver assembly using magnetic fields, the inertial measurement unit producing IMU inertial measurements of motion of the selected object relative to an inertially fixed reference frame, the inertial navigation system producing INS inertial measurements of motion of the moving reference frame relative to the inertially fixed reference frame, the tracking processor receiving electromagnetic measurements resulting from the magnetic communication between the reference frame transceiver assembly and the object transceiver assembly, the tracking processor determining the position of the selected object relative to the moving reference frame by using the IMU inertial measurements and the INS inertial measurements to optimize the electromagnetic measurements.

French Patent FR2807831 is also known in prior art describing a device for measuring the position and orientation of a mobile object relative to a fixed structure, in a disturbed magnetic environment, including:
- a first assembly of orthogonal coils emitting magnetic fields, secured to the fixed structure, defining a reference mark;
- a second assembly of orthogonal coils receiving magnetic field(s), secured to the object, and forming a sensor, each of the coils belonging to a sensor channel.

Such a device includes means:
- for simultaneous and continuous field emission, on the coils of the first assembly;
- for measuring, on the sensor channels, the vector sum of the emitted fields and of the disturbance fields generated by the environment;
- for evaluating the disturbance fields;
- for estimating fields emitted in an undisturbed environment by suppressing the evaluated disturbance fields from the vector sum; and
- for computing the position and orientation of the object in the reference mark.

U.S. Pat. No. 5,646,525 describes another example of equipment for determining the position and orientation of a helmet worn by a crew member in a vehicle including a generator, associated with the vehicle, which produces a rotating magnetic and electric field of fixed strength, the orientation and frequency within at least a portion of the vehicle. The apparatus also includes a plurality of detectors, each of which generates a signal proportional to at least one of the electric or magnetic fields, at least one point associated with the helmet and calculation circuitry responsive to the signal for determining the coordinates of the at least one point relative to the generator and for determining the position and orientation of the helmet.

U.S. Pat. No. 6,400,139 also describes an example of an apparatus for position/orientation tracking within a bounded volume. The methods and apparatus employ at least one fixed sensor, called a "witness sensor," having a fixed position and orientation near or within the volume to account for electromagnetic distortion. One or more probe sensors are placed on an object having to be tracked within the volume, and the output of each witness sensor is used to compute the parameters of a non-real effective electromagnetic source. The parameters of the effective source are used as inputs for the computation of the position and orientation measured by each probe sensor, as if the object were in the non-distorted electromagnetic field produced by the effective source or sources. In addition to trackers for the helmet-mounted displays in aircraft, tank, and armored-vehicle applications, the invention finds utility in any electromagnetic tracking system that might be subject to electromagnetic distortion or interference.

In general, the solutions of prior art do not teach solutions to compensate for the disturbances not correlated with the transmitters (actual emitted fields).

U.S. Pat. No. 7,640,106 requires a first inertial sensor in the helmet and a second inertial sensor and an estimator (Kalman filter) for determining an orientation of an object. The solution requires providing a sensor on the fixed platform in order to determine the angular orientation of the helmet in the mark of the platform by incorporating the estimated relative velocity. Relative velocity is obtained by measuring the difference between:

the angular velocity of the mobile body measured at the output of an IMU angular velocity sensor attached to the mobile body, the orientation of which is to be determined, measured in a fixed inertial frame (inertial reference frame); and the angular velocity of the inertial platform measured by an INS-type inertial unit.

The solution, therefore, requires a double inertial system, doubling the noise and the errors.

Furthermore, the solution does not take into account the strong electromagnetic disturbances observed in a real cell, for example, a helicopter or airplane cell.

Furthermore, the solution requires an estimation to be carried out of the angular velocity.

The solution taught by U.S. Pat. No. 6,400,139 includes the interpolation of data coming from a plurality of sensors in view of creating a model of the fields sent by real sources, and modelling unknown or dummy sources to compensate the Eddy current disturbances. The solution consists of installing a plurality of fixed witness sensors in the vicinity of the volume in which the mobile body moves, in order to construct a model of the field measured by the witness sensors. The model is used for recomputing by interpolation the field measured by the sensor positioned on the mobile object, which does not make it possible to compensate the disturbance fields of Eddy currents, nor does it make it possible to process the disturbances of radiated and non-correlated disturbances (EMI). Only the ECI-type disturbances are correlated with the emitted radiative field.

All of the solutions of prior art require the use of an additional inertial platform to determine an additional mark in addition to the reference system provided by the inertial system of the aircraft, which complicates the implementation and the errors.

BRIEF SUMMARY

The object of the disclosure relates to a system aiming to remedy the disadvantages of the prior art and to establish a method and produce a process for eliminating electromagnetic disturbances (ECI: Eddy currents, FMI: induced ferromagnetism) in real time without requiring the very expensive need to map the effective volume scanned by the sensor.

Another aim of the disclosure is to improve the signal-to-noise S/N ratio of the P/O detector for obtaining the required performances in environments significantly disturbed by EMI (for example, in aircraft and, more specifically, in helicopters: radiated fields created by on-board generators and on-board equipment). The signal-to-noise S/N ratio may be expressed as the ratio between the standard deviation of the signal Sc received by the sensor in "free space," i.e., without any electromagnetic disturbance and the standard deviation of the noise B, the noise being the sum of all of the signals not coming directly from the transmitter (inductive field).

The purpose of the disclosure is to achieve an improvement of the S/N ratio in the order of 1000 for the most critical cases (helicopters).

A third aim of the disclosure is to compensate the latency of the output information through hybridization with an inertial system.

By referring to FIGS. 2, 3 and 4, which will subsequently be explained, it is indicated that functions of the disclosure:

Deploy an optimized transmitter E in the following directions:

Generation of alternating currents by E-2 according to a specific temporal pattern on a finished temporal support and being repeated sequentially. The pattern is preferably a Pseudo-Random Binary Sequence (PRBS) generated by E-4 of the processor 4.

Multiplication by three to ten of the signal emitted relative to the transmitters of prior art (comparable reference distance, volume). The method consists of optimizing the winding shapes of the transmission axes to increase the number of turns for a given diameter of wire and to introduce a core of very permeable material of specific shape for increasing the induction emitted in ratios higher than 10:E-1.

Reduction of the total power and, in particular, the power lost by Joule effect, which increases the temperature and may cause the results to shift (expansions, deformations, etc.), which amounts to reducing the emission current.

Control E-2 of the system in magnetic field as a result of sensors E-3 (also known as "sensors_E") being included in the coils of the transmission axes.

Control of the magnetization of the magnetic coils by measurement of the symmetry of the alternating currents injected by E-1-2.

Measure the total field by a sensor with Ne axes C-1, the bandwidth of which ranges from a few tens to a few thousands of Hertz, the output Sc of which is at Ne components.

Acquire by the processor 4 the data Xu from E, Sc from C-1, Sp from C-2, $\vec{\omega}$ angular velocity of the object M and A=ψ, θ, φ the attitudes of the platform both from C-3, all of the inertial measurements.

Filter the various disturbances (noises) of Sc (measurement of the sensor_C from C-1), i.e., the radiated disturbances (EMI), the disturbances created by the Eddy currents (ECI for Eddy Current Interferences) circulating in the conductors situated in a close volume and caused by the variable fields emitted by the transmitter, as well as the FerroMagnetic effects (FMI for FerroMagnetic Interferences):

The noised signal Sc is measured by the receiving assembly C-1, the noise Sp is measured and estimated from the measuring device C-2. It will subsequently be described that, in a particular embodiment, according to the conditions of the environment, the noise may be estimated from the device C-1, preferably over a time during which no current is sent into the coils E-1 by E-4.

The filtering, subsequently explained in a first embodiment, is performed in the processor 4-4 by constructing a temporal model of the preceding disturbances and by estimating therefrom the parameters using an optimal or sub-optimal filter in real time over short times $T_{off}$ during which the currents injected into coils E-1 are zero. The variables of the model are magnitudes varying over time, independent or weakly correlated from the statistical point of view that make it possible to show the variations of useful signals and noises. In a second embodiment, an embodiment of the ambient noise $S_b$ is measured by a sensor block C2, a complete model of which is modelled as previously. The parameters of the model are used to eliminate by subtraction all of the components of $S_b$ correlated with the fields emitted by coils E-1. Thus, the non-correlated noise is extracted to become an independent variable of the linear magnetic model of the signals measured by the sensor C-1 attached to M.

Determine, from all of the parameters identified, the parameters of the single model of the fields emitted by the axes of the transmitter (field known as undisturbed "free space") and, in particular, the matrix for computing in a known manner the position and orientation of the mobile object.

Improve the dynamic behavior of the detector, in particular, by minimizing the latency of the detector, i.e., the time between the real instant of occurrence of an event over the magnitude to be measured and the detection thereof by the P/O determination system. The improvement is made through hybridization of the preceding magnetic detection with an inertial assembly for measuring the angular velocities of the mobile object and use of the attitudes of the inertial unit of the platform.

In the disclosure, which will subsequently be described in more detail, the currents injected into the windings that create the inductions, are preferably simultaneous. The measured inductions are, therefore, the sum of the fields emitted at instant t and the fields present in the environment. Therefore, the aim of the disclosure is to distinguish in the measured field each component emitted by each transmission axis. The recognition of the field emitted by one of the components constitutes demultiplexing of the inductions that can be functionally qualified by comparison with the inventions cited that either perform temporal demultiplexing (emission not simultaneous but sequenced over time) or frequential demultiplexing (detection of frequencies in the spectral range). When the fields are demultiplexed, it is considered that three independent emissions were received on three sensor axes.

With regard to the hybrid system, the principle of the disclosure consists of using the attitude provided by the magnetic tracker means expressed in the fixed inertial frame to reset or initialize the computation of the attitude of the IMU gyrometric sensors obtained by incorporation into the inertial frame of a dynamic equation for predicting a quaternion. The attitude of the tracker means expressed in the inertial frame simply uses the attitude of the platform provided by the INS, in the form of three Euler angles or DCM matrix (direction cosine matrix of the platform) or of the quaternion computed from the Euler angles or DCM matrix. The dynamic prediction model, computed at high speed, is reset to time $t-T_L$, $T_L$ being the latency time of the magnetic tracker means, at each arrival of the quaternion provided by the magnetic tracker means. The information necessary for computing the quaternion (in particular, the angular velocities of the IMU of the mobile object) having been stored in memory over time $T_L$, the quaternion prediction model is recomputed from time $t-T_L$ up to the current time t by using the velocities stored in memory. Beyond time t up to the next arrival of the magnetic tracker information, the quaternion is computed at the frequency for acquiring angular velocity measurements. The disclosure also comprises the real-time correction of the triaxial angular velocity sensor by estimation of the errors of the sensor.

BRIEF DESCRIPTION OF THE DRAWINGS

The present disclosure will be better understood upon reading the following description, concerning non-limiting examples of embodiments of the disclosure referring to the accompanying drawings where.

DETAILED DESCRIPTION

Figure 1A:
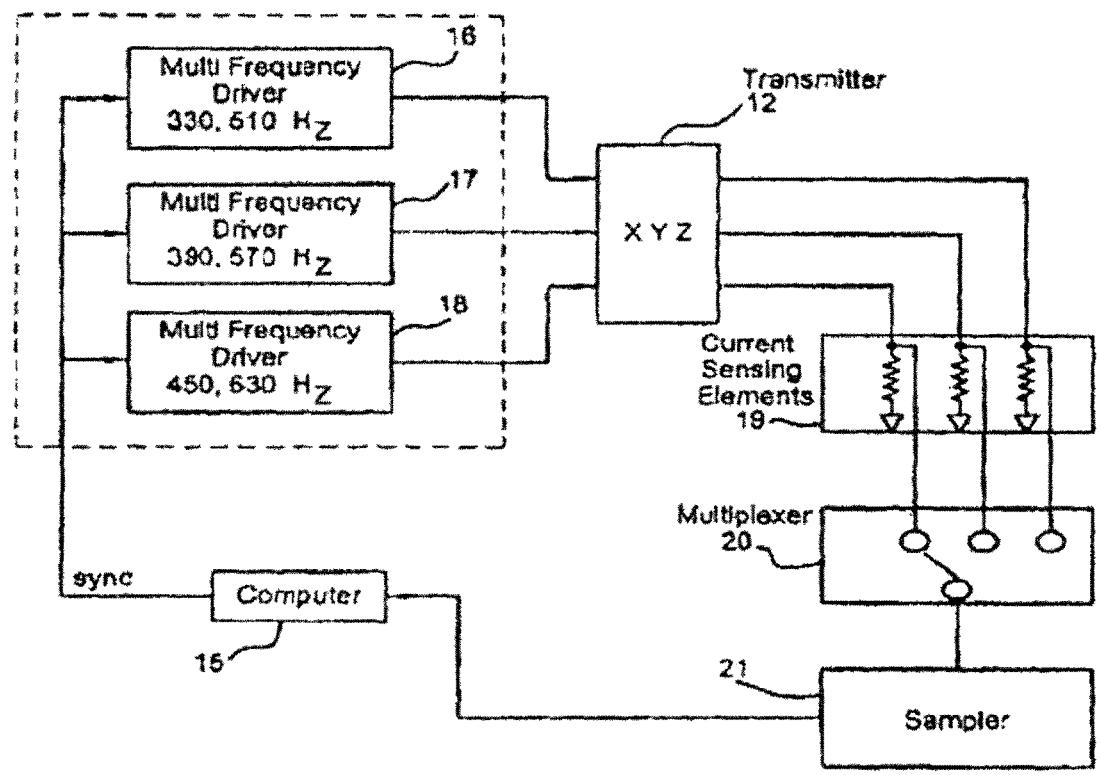
FIGS. 1A-1C show schematic views of solutions of prior art.
Figure 1B:
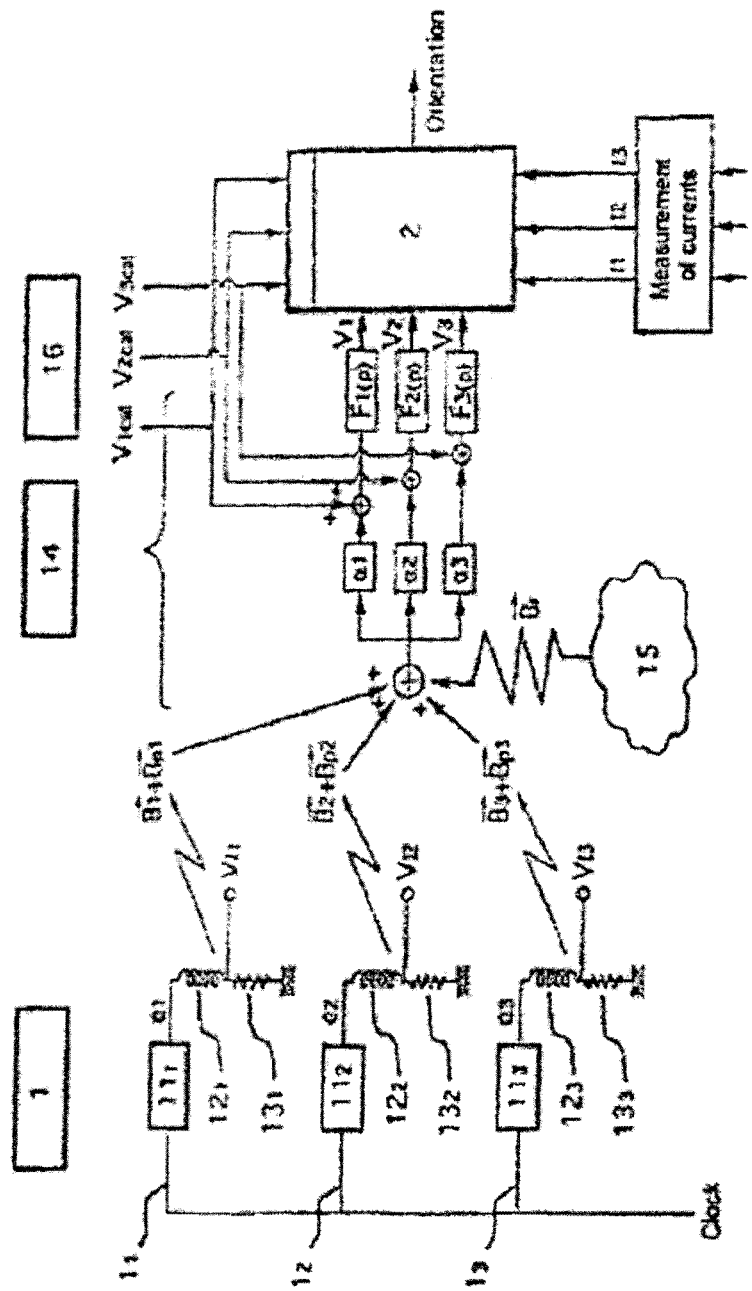
Figure 1C:
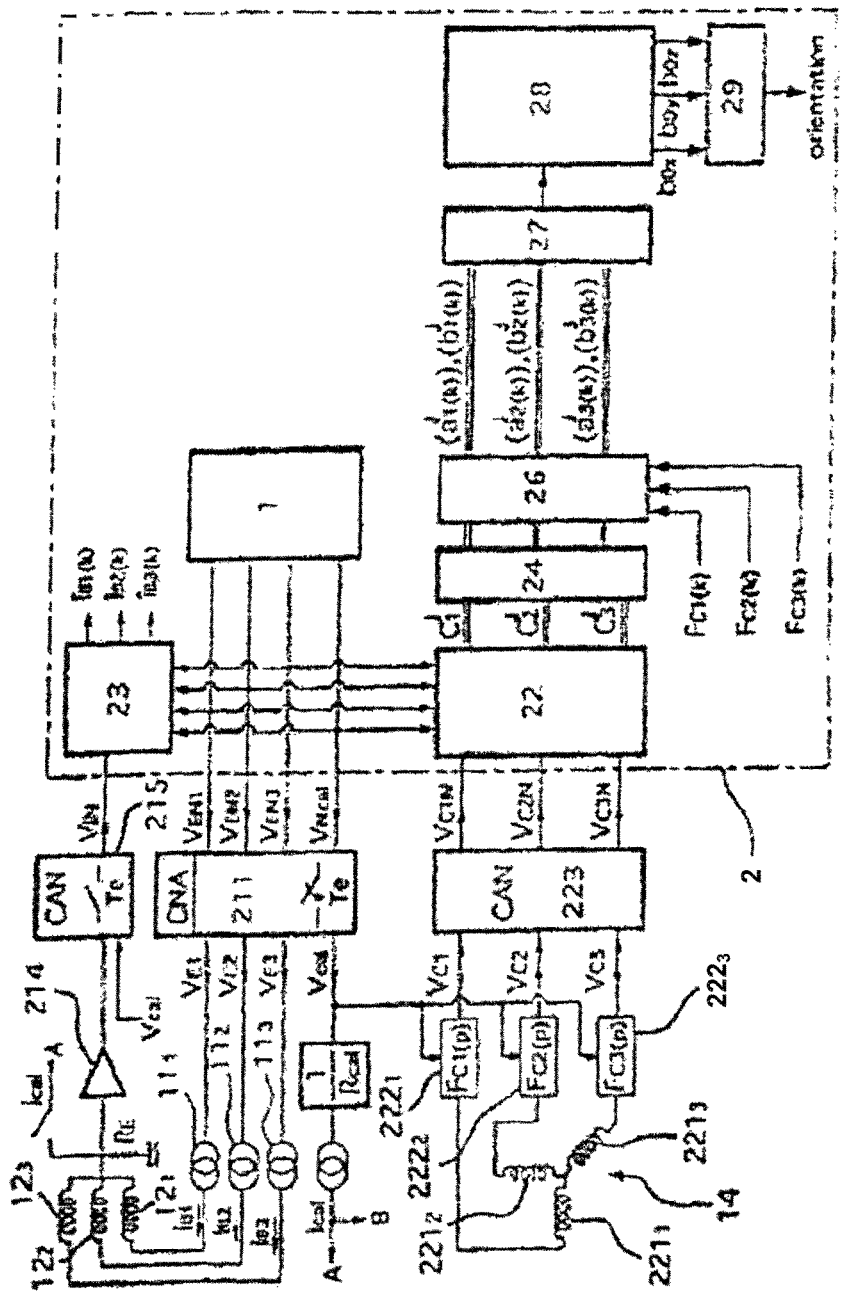
Figure 2:
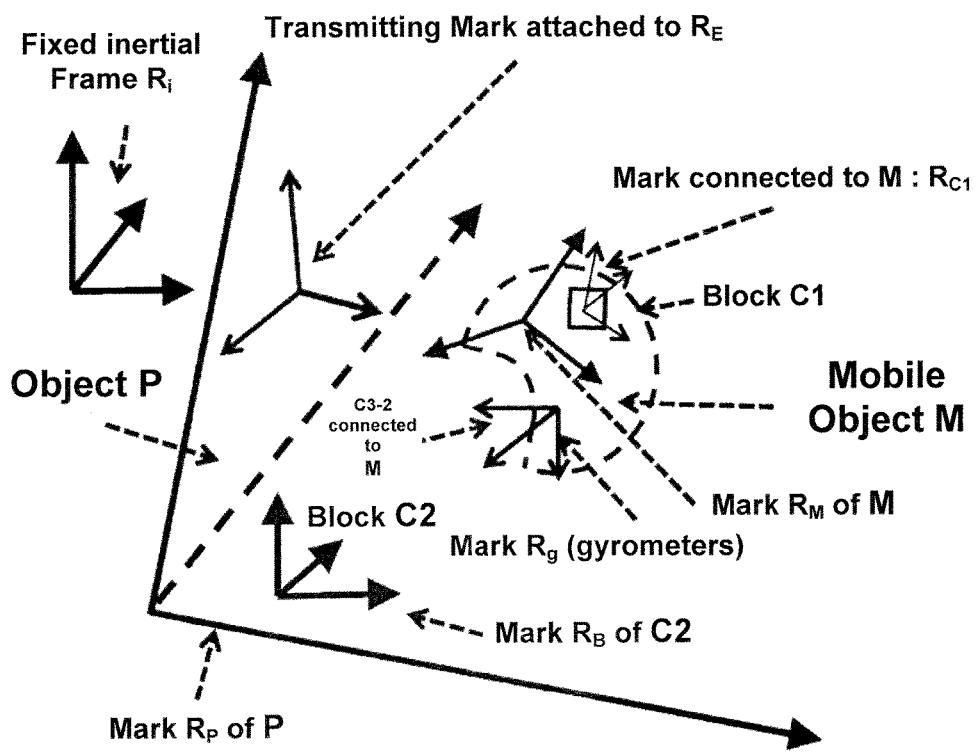
FIG. 2 shows a schematic view of the mark and object reference system.

According to FIG. 2, the system for contactless determination of the position and orientation (P/O) of a first object M, the associated orthogonal mark $R_M$ of which is mobile relative to a reference mark carried by a second object P (Platform), fixed or mobile relative to an inertial reference frame $R_i$ of fixed orientation relative to the stars situated at the center of the earth. The device is arranged in a disturbed electromagnetic environment. A transmitter E consisting of $N_i$ coils forming a quasi-orthogonal mark $R_E$ is rigidly attached to the platform P. The transfer matrix $R_{E/P}$ between transmitter mark $R_E$ and platform mark $R_P$ is presumed constant and measured during installation of the mechanical reference of the transmitter in the platform P. When the mark $R_P$ is mobile relative to $R_i$, as is the case when the platform is an aircraft, the mark $R_P$ is defined in the mark $R_i$ by the Euler angles defining the attitude and computed by the inertial unit or an equivalent device and transmitted to the process of the disclosure. It should be noted that the quaternion $Q_{PI}$ like the transfer matrix $R_{P/I}$ between $R_P$ and $R_i$ represent the attitude of P relative to $R_i$. On the mobile object M are rigidly attached the magnetic sensor with Nc quasi-orthogonal axes C-1 known as sensor_C and the inertial sensor C-3-1 of three orthogonal axes angular velocities. The latter sensor is, for example, of MEMS (Micro-Electro-Mechanical Systems) type, which measures the angular velocities in its own reference mark $R_{gi}$, the orientation of which is presumed known by an in-factory measurement according to procedures known by the person skilled in the art. The sensor C-1 is a sensor for measuring the magnetic induction field of fluxgate, fluxmeter, controlled fluxmeter, Hall effect sensor, AMR, GMR, TMR, etc. The axes thereof are defined by the transfer matrix $R_{C/M}$ fixed and identified in the factory in a known manner.

Figure 3A:
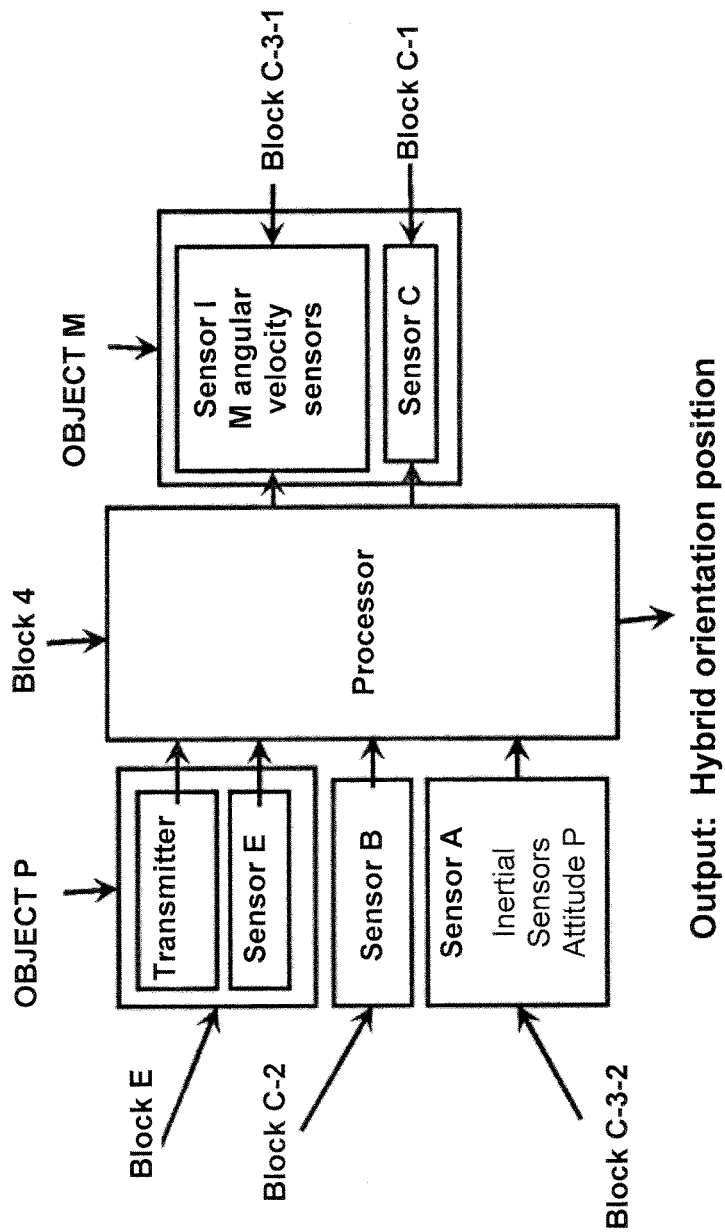
FIGS. 3A and 3B show schematic views of the architecture of the disclosure.

In the case of some applications for which the environments are significantly magnetically disturbed by EMI, a particular embodiment consists of adding a certain number of sensors known as sensor_B represented by block C-2 in FIG. 3A. The sensors are attached to the platform. The sensors are 1- to 3-axis sensors of the same type as the magnetic sensor C-1, and the number thereof is higher than or equal to 1. The orientation and position thereof may not be known accurately, which constitutes an advantage. These are placed at a sufficiently large distance from the transmitter in the environment of the platform in order to measure as little as possible the field emitted by the transmitter E. The aim is to measure the EMI present in the environment of the sensor C-1. Ideally, a single axis is sufficient but one or more 1- to 3-axis sensors may have to be placed close to specific equipment of the platform to measure harmful disturbances related to the item(s) of equipment.

General Architecture

Figure 3B:
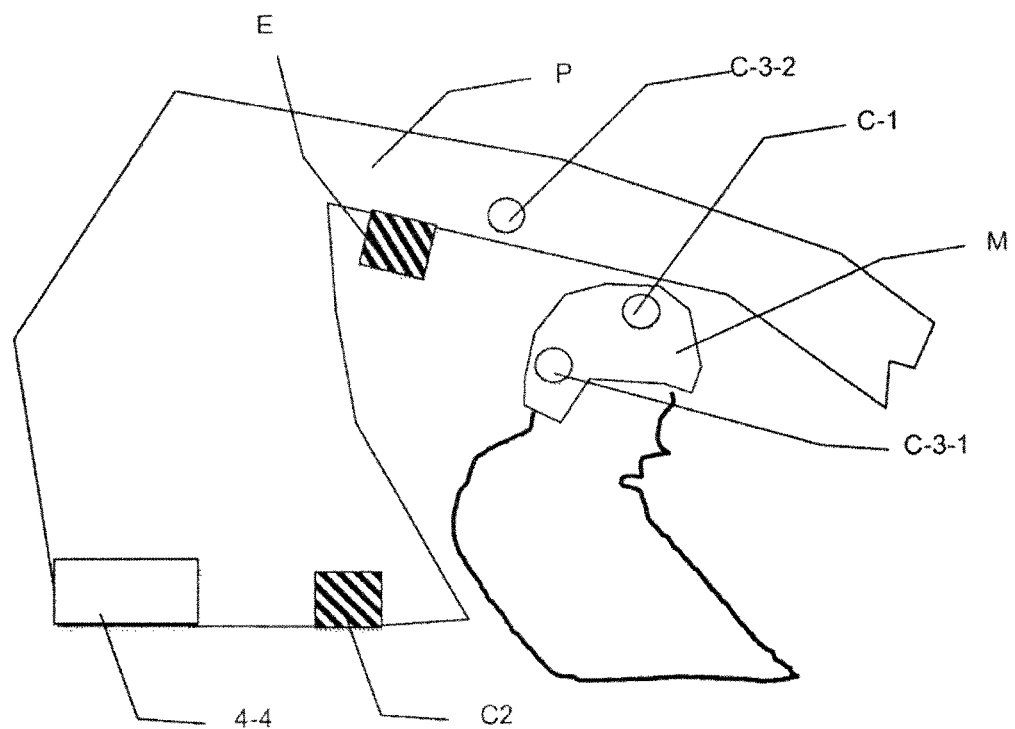

FIG. 3B shows a schematic view of the hardware architecture of the system according to the disclosure.

The mobile body (M) is a helicopter pilot helmet, the cell of the helicopter forming the platform (P).

On the helmet (M) are attached an electromagnetic sensor (C-1) and an IMU inertial sensor (C-3-1), the two sensors being mechanically connected in a rigid manner to the helmet (M).

On the platform P are attached:
a transmitter E;
an inertial platform C-3-2; and
a reference electromagnetic sensor C2.

A computer (4-4) receives the signals from the various components and carries out the processes described below.

Figure 4:
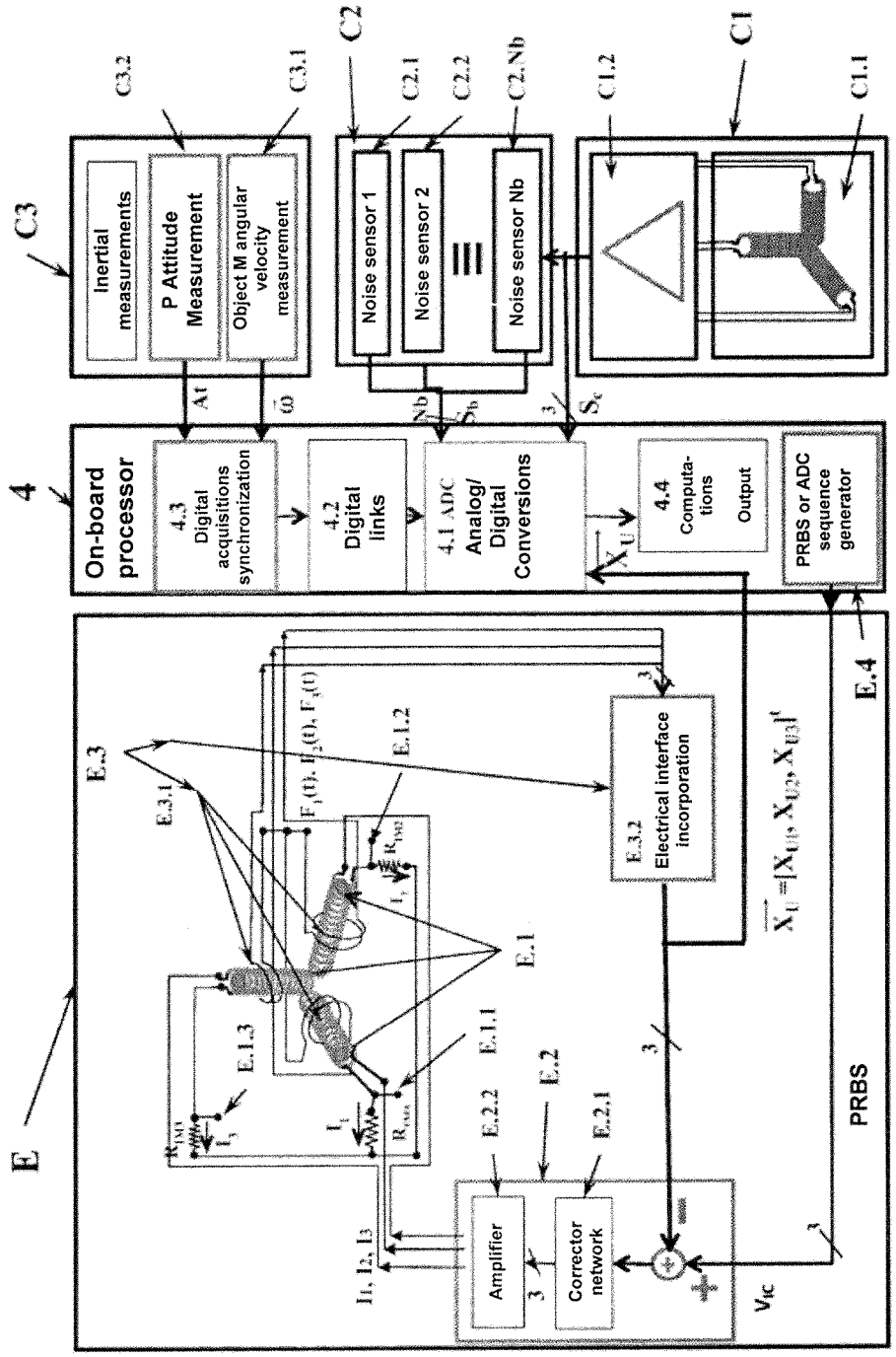
FIG. 4 shows a schematic view of the detailed architecture of the disclosure.

FIG. 4 explains the assemblies known as "blocks" and shown in FIGS. 2 and 3A:

A first assembly E for transmitting magnetic induction(s), comprising a first transmitting sub-assembly E-1 of Ne, Ne being equal to at least two transmitting coils, the axes of symmetry of which, not parallel with one another, form a mark $R_E$ attached to the second object P.

A first receiving assembly C-1, attached to the mobile object M and comprising Nc>=2 non-parallel receiving coils, forming a mark $R_{C1}$, sensitive to the ambient magnetic field resulting from the vector sum of the fields emitted by the first transmitting assembly E and disturbing magnetic fields generated by electric currents existing in the environment and by ferromagnetic magnetizations, the second assembly forming a sensor C-1 secured to the first mobile object M and such that the product Nc*Ne>=6, the first mobile object M has a reference mark $R_M$. The orientation of the mark $R_{C1}$ relative to the mark $R_M$ is constant and noted by $R_{C1/M}$ the direction cosine matrix of the axes of C-1 in RM. The Nc components of SC form the output of the first receiving assembly C-1.

A computing processor 4 for computing the position and orientation of the first mobile object, coupled with the first analog/digital conversion (or ADC) means 4-1 for carrying out the acquisition, at discrete times $t_k$=k*Te, of analog signals $S_c$, $X_{u1}$ and $S_b$ according to FIG. 4, which will be better described subsequently, the second analog/digital conversion means E4, which generates the command of the temporal sequence of currents.

Notations

In a preferred embodiment, Ne=Nc=3 will be taken.

The total field $B_{TE}$, three-component vector (pseudo vector), existing at the center of the sensor is the sum of the following inductions:

$$\vec{B}_{TE} = \vec{B}_{EU} + \vec{B}_{EMI} + \vec{B}_{ECI} + \vec{B}_{FMI} + \vec{B}_T \quad [1]$$

with $$\vec{B}_{EU} = \vec{B}_{EU1} + \vec{B}_{EU2} + \vec{B}_{EU3} \quad [2]$$

where $\vec{B}_{EUj}$ is the induction expressed in the transmitter mark, and emitted by the transmission axis j (j=1 to 3) at the center of the sensor C-1. It is presumed in the equation [2] that the emission is simultaneous on the three transmission axes E1, since $B_{EU}$ is the sum of the three inductions.

$B_{EMI}$ is the vector of the induction radiated in the environment, for example, generated by the currents circulating in the electrical equipment, by the on-board generators, by the 50-60 Hz sector, etc. The same can be modelled by the sum of periodic fields $B_{SC}$ not correlated with the $B_{EUj}$ and fields $B_R$, which are EMI signals, the characteristics of which are presumed random because they cannot be represented by deterministic signals of known or estimated characteristics.

$$\vec{B}_{RM}(t_k) = \vec{B}_{SC} + \vec{B}_R \quad [3]$$

$B_{ECI}$ is the induction vector at the center of the sensor, created by the Eddy currents in the conductors situated in the environment of the P/O system, the same produced by the magnetic field emitted by the transmitting antenna at the location where the conductors are found.

$B_{FMI}$ is the induction vector at the center of the sensor, created by the magnetization of ferromagnetic materials situated in the environment of the P/O system.

$B_T$ is the induction of the earth's magnetic field.

It should be noted that, according to FIG. 4, the induction $B_{EU}$ is the useful signal very strongly correlated with the emitted currents and, more specifically, $B_{EU}$ is linearly dependent on the measurements Xu of the fields emitted by the three axes E1 and measured according to E-3, the inductions $B_{ECI}$ and $B_{FMI}$ are also strongly correlated with the emitted field Xu.

One of the aims of the disclosure is to eliminate by filtering all of the inductions so as to only keep the measured vector, the model of which is expressed by $B_{CU}=[R_{c/e}]^t (B_{Eu1}+B_{Eu2}\ B_{Eu3})$ where $B_{EU1}$, $B_{EU2}$, $B_{EU3}$ are the three-component vectors of the field emitted and received at the center of the sensor (expressed in the mark of the transmitter) and $R_{C/E}$ is the rotation of the sensor mark relative to the mark of the transmitter. Demultiplexing of the transmission channels is carried out (recognition of the portion of the signals that comes from the transmission channel j=1 to 3), i.e., to determine the components $Bc_1$, $Bc_2$, $Bc_3$ of the sensor C-1 coming from the emission of the axes 1, 2 and 3 of the transmitter E-1 in order to form the 3×3 matrix: [Bcu]= [$Bc_1|Bc_2|Bc_3$]. The method for computing the rotation of the sensor is obtained in a known manner (U.S. Pat. No. 4,287,809 to Egli): knowing $B_{cu}$, an estimation of $B_{EU}$ is deduced by using an induction model in free space (without disturbances): $R_{C/E}=B_C\ B_{EU}^{-1}$.

From the matrix [$R_{c/e}$], the Euler angles or the quaternion $Q^{EM}$, which are two representations of the attitude of the object M, are taken in a known manner.

The static and dynamic accuracy performances are obviously increasing with the S/N ratio. The increase of the S/N ratio sought is obtained in two obvious and complementary manners: increase the power (or the amplitude) of the useful signal in particular in low frequency and jointly reduce the power of the noise by filtering.

Transmitting Assembly E

Figure 5:
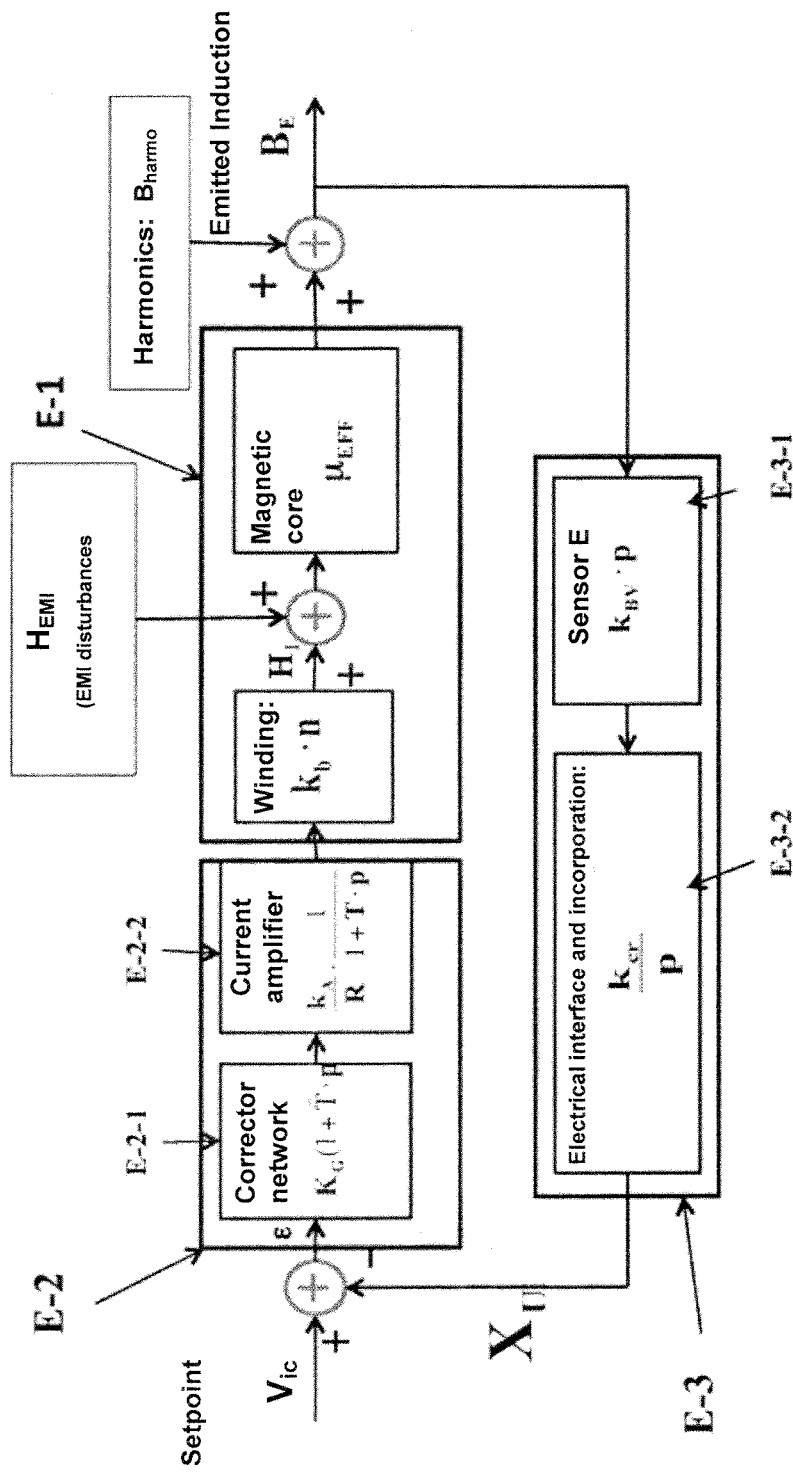
FIG. 5 shows a schematic view of the control of the emitted inductions.

A first aim of the disclosure is the assembly E, which includes according to FIG. 4:

a second transmitting sub-assembly consisting of Ne means of injection E-2 of predetermined currents through the j coils E-1, j=1 to Ne of the first assembly E in order to generate a predetermined induction flux Fj(t) as a function of the time according to the characteristics specific to each axis j of the coils; a preferred embodiment consists of including in the interior volume of the j coils E-1 a highly permeable magnetic material of the type ferrite bar or µmetal wires or of ferromagnetic alloy such as VITROVAC® or PERMALLOY®, etc. The magnetic material, as will be subsequently described, makes it possible to multiply the magnetic induction under certain conditions of form, which will be discussed.

a third sub-assembly E-3 of the first transmitting assembly E consisting of means of measurement of the electromotive force due to the induction flux Fj(t) relative to each axis of the Ne transmitting coils E-1, the assembly E-3 including one magnetic sensor for each transmission axis, which measures the flux emitted, and one electronic for adapting the signals E-3-2. Any magnetic induction sensor (fluxgate, controlled fluxmeter, Hall effect sensor, AMR, GMR, TMR) may also be suitable for measuring the fields. However, a preferred embodiment consists of winding the turns concentrically relative to the coils E-1 to form a simple fluxmeter sensor. A voltage amplifier E-3-2, preferably comprising a pure incorporation of the signals such that the magnitudes $X_{Uj}$ are homogeneous to a magnetic induction, produces the interface on one hand with the ADC acquisition system 4-1 of the processor 4, on the other hand with the block E-2, which constitutes the current control device of the coils E-1. The input or setpoint of the control E-2 is the three-component signal $V_{IC}$ provided by the block E-4, which is the generator of the sequence of Ne predetermined cyclical currents of periodicity $T_{obs}$. The block may be autonomous (memory equipped with a sequencer and containing the sequences of setpoint values of the currents) or even, in a preferred embodiment indicated in FIG. 4, incorporated into the processor 4. The values of the sequence are preferably random binary values, the sequence is known as PRBS for Pseudo-Random Binary Sequence, the embodiment and properties of which are known by the person skilled in the art. The binary values of the sequence between $-V_{IC}$ and $+V_{IC}$ volts are provided with the recurrence of $T_e = T_{obs}/N_{obs}$ where $N_{obs}$ is the characteristic number of values of the sequence generated. The same are deterministic signals over the duration $T_{obs}$ of constant spectral density as a random noise known as white, over the range of frequencies between $1/T_{obs}$ and $1/T_e$. FIG. 5 shows for one of the axes j the transfer functions of blocks E-1, E-2, E-3 from FIG. 4, which form part of the control of the emitted magnetic induction. The signals $Xu_j$ constituting the measurement of the magnetic inductions emitted by the axes E-1 are subtracted from the corresponding signals $V_{IC}$ to form the error c of the control, the same being processed by a corrector network E-2-1, which compensates in a known manner the transfer function of the current amplifier and mainly the time constant T of the windings with magnetically permeable core E-1, the time constant T being close to the ratio between the total inductance L and the resistance $r_b$ of the coil. The transfer function of the current generator block E-2-2 takes into account the characteristics of the winding. The magnetic field $H_I$ produced by the current is proportional to the number of turns per unit of length n with a coefficient of proportionality $K_b$, which depends in a known manner on the geometrical shape of the winding. The magnetization of the core is based on the sum of $H_I$ and the disturbing magnetic fields present in the environment $H_{EMI}$. The magnetic induction $B_E$ produced in a point of the space outside of the windings by the currents and the core may be written $B_E = \mu_{eff} (H_I + H_{EMI})$, where $\mu_{eff}$ effective permeability represents the proportionality term between the magnetic excitation field $H_1$ and the output magnetic induction, the magnetic field $H_I$ is proportional to n*I, "n" being the number of turns per unit of length and I is the intensity of the current circulating in the turns of the transmitting coil E-1. It is known that the coefficient $\mu_{eff}$ is based on the relative permeability of the magnetic material, of the geometrical shape of the cores, the shape determining the demagnetizing field within the material, of the ratio between the interior volume of the coil and the volume of the material, but also losses by Eddy currents. The means for obtaining the values of $\mu_{eff} >> 100$ will subsequently be indicated. In the control, the detector of the electromotive force E-3-1 previously described has a transfer function $K_{BV}*p$ (derivation with induction conversion variation $\Delta B_E/\text{Volt} = K_{BV}$ into Tesla per Volt). The block E-3-2 carries out a pure incorporation of gain $K_{CR}$ to obtain a homogeneous output with the setpoint $V_{ic}$.

The main object of the control is to cancel out the EMI magnetic fields present in the environment, which are added to the exciter field proportional to $n*I_j$, where $I_j$ is the current relative to the winding j, but also to linearize the coefficient $\mu_{eff}$ because it is known that the magnetization of magnetic materials has a non-linear magnetization curve with saturation for the strong excitations.

From FIG. 5, it is easily shown that the output $B_E$ is the following:

$$B_E = \frac{G \cdot F}{1 + G \cdot F} \frac{V_{ic}}{F} + \frac{\mu_{eff}}{G \cdot F} H_{EMI}$$

with $$F = \frac{\Delta V_{IC}}{\Delta B_E}$$

and $$G = K_G \frac{K_A}{R} K_b \cdot n \cdot \mu_{eff} \frac{1 + \hat{T} p}{1 + T p};$$

$\mu_{eff}$ is the effective permeability if in addition in the useful band: GF>>1

$$B_E \approx \frac{V_{ic}}{F} + \frac{\mu_{eff}}{\mu_0 \cdot G \cdot F} B_{EMI} = \frac{V_{ic}}{F} + \frac{\mu_{r\_eff}}{G \cdot F} B_{EMI} \quad [4]$$

with $\mu_{r\_eff}$ effective relative permeability
where $B_{EC}$ is the induction produced at the center of the core and $\mu_{r\_eff}$ the effective relative permeability. The signal-to-noise ratio in the coreless and control-less configuration is $$\frac{V_{ic}}{F} / B_{EMI}.$$

With core for E-1 and control E-2, it is seen that the signal-to-noise ratio is $$\frac{V_{ic}}{F} / \frac{\mu_{r\_eff}}{G \cdot F} B_{EMI}.$$

To keep the same signal-to-noise ratio while keeping the same order of magnitude for $B_E$ in output, it is, therefore, necessary that $G \cdot F \geq \mu_{r\_eff}$. The relation defines the minimum gain of the control chain. The corrector network of the shifted proportional type $K_G$ (1+T̂p) must be adjusted according to the rules known for ensuring the stability of the control. It is also possible to produce a PID according to the techniques taught automatically. Another interesting aspect of the disclosure is the linearization of the field emitted by the control. As $\mu_{r\_eff}$ is a highly non-linear function, the hamionics $B_{harmo}$ appear as output of E-1 in FIG. 5. If the output is expressed according to the inputs $V_{ic}$, $B_{EMI}$ and $B_{harmo}$, the following is obtained:

$$B_E = \frac{G \cdot F}{1+G \cdot F}\left(\frac{V_{ic}}{F} + \frac{B_{harmo}}{G \cdot F} + \frac{\mu_{r\_eff}}{G \cdot F}B_{EMI}\right) \quad [5]$$

$$B_E \approx \frac{1}{F}\left(V_{ic} + \frac{B_{harmo}}{G} + \frac{\mu_{r\_eff}}{G}B_{EMI}\right)$$

It is observed that if G*F>>1, the amplitudes of the harmonics are divided by the gain of the direct chain G. That said, as will be highlighted in the paragraph dealing with the modelling and filtering, the fact of measuring $X_{uj}$ and of using reference signals of the induction emitted in the model of signals received, makes the filtering device insensitive to harmonics, which is a fundamental advantage relative to existing systems for which the measurement of the current in E1.1, E1.2, E1.3 is no longer the image of the induction emitted following the appearance of harmonics.

Figure 6:
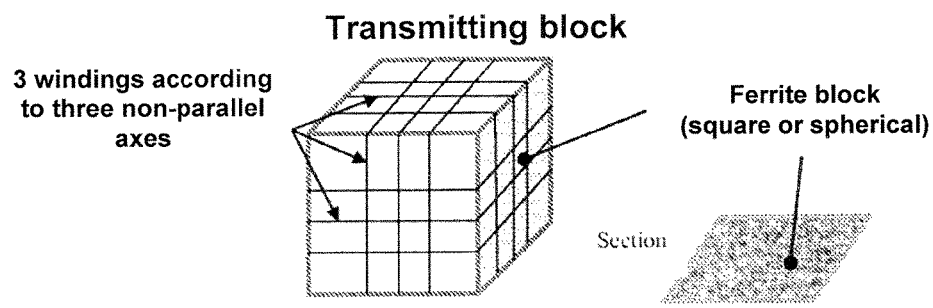
FIG. 6 shows a schematic view of a transmitter block of prior art.

As said previously, one of the aspects of the disclosure consists of producing a core in order to obtain an effective relative permeability $\mu_{r\_eff}$ of a few hundreds of units. The existence of cores of ferrite or of shims made of ferromagnetic alloy exists in a number of applications. The latter used, for example, in transformers, must be laminated to reduce the Eddy currents, which counter the magnetization and cause losses. Ferrite, much more conductive than ferromagnetic alloys, makes it possible to use cores with uniform density of the matter obtained by sintering. In general, the cores are spherical or cubic (or even parallelepiped) according to FIG. 6. The magnetization of the permeable matter of the cores subject to an excitation of magnetic field is a complex phenomenon because of developing a demagnetizing field that counters the excitation field. The demagnetization field is often explained by the creation of dummy magnetic fields on the surface of the volumes of ferromagnetic matter. Therefore, it is simply explained that the demagnetizing field is closely linked to the geometry of the volume of the core and to the magnetization. The demagnetizing field can only be computed for simple examples (sphere, ellipsoids, cylinders). In the general case, approximations are made. Thus, for a sphere of material of infinite relative permeability $\mu_r$, it is shown (c.f. J. D. Jackson, *Classical Electrodynamics*, ed. Wiley) that the effective relative permeability $\mu_{r\_eff}$ is at a maximum of three. For a cube, the value is of the same order of magnitude. With cubic or spherical cores, very high gains cannot be expected. It is known that for elongated cylinder-shaped bars of diameter D and length L, the demagnetizing field $H_D$ at the center is $-0.5*(D/L)^2*M$, i.e., Hd=−δ*M where the magnetization M is of the type M=($\mu_R$−1)H, H being the magnetic field present within the material after the magnetization, with the relation H=$H_0$-$H_D$, $H_0$ being the external magnetic excitation field and δ is the demagnetizing factor. Close to the edges, the demagnetizing field is M/2.

From the preceding relations, a formula of the induction is deduced, for the ellipsoids of which the magnetization is uniform, $$B = \mu_0 \cdot \frac{\mu_R}{1+(\mu_R - 1) \cdot \delta} H_0 \quad [6]$$

and if $$\mu_R \gg 1,$$

$$B = \frac{\mu_R}{1+\mu_R \cdot \delta}B_0.$$

In general, $\mu_R \cdot \delta \gg 1$, therefore, $$B = \frac{B_0}{\delta}.$$

Using the preceding example of the elongated bar, this gives $$B = 2 \cdot \left(\frac{L}{D}\right)^2 \cdot B_0 = \mu_r \cdot B_0.$$

The relation is only approximate, the value of $\mu_r$ is, in general, lower because the magnetization is not uniform. Experimentally, the exponent is between one and two, but an increase in the induction in the order of $\mu_r$ is indeed observed in the volume of the material, but also on the outside.

Therefore, the disclosure consists of an arrangement of permeable bars of L/D ratio chosen so that the gain in induction $\mu_{r\_eff}=\alpha \cdot \mu_r$ is higher than ten. The coefficient α, lower than the unit, takes into account a plurality of factors, in particular:
  the volume of magnetized material parallel with each axis of the coils, with each axis having to have the same volume and the volume of each one is a third of the total volume available.
  the manner in which they are wound, the turns producing the excitation field $H_0$.
  the Eddy currents induced by $H_0$.

Figure 7:
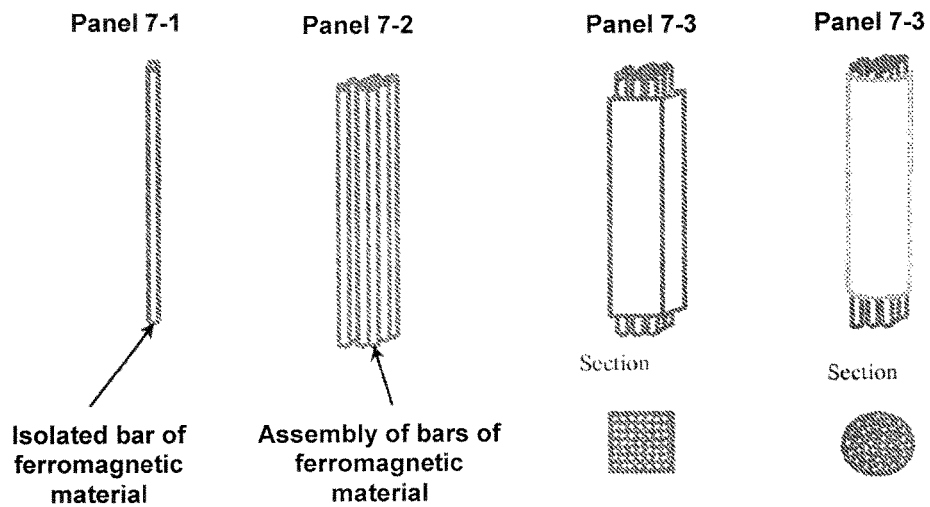
FIG. 7 shows the schematic view of the formation of an axis E1 of the transmitter according to the disclosure.

According to the disclosure, to optimize the coefficient α, very thin bars of permeable material are used, for example, wires of μmetal, PERMALLOY® or VITROVAC® electrically isolated in advance, stored according to Panel 7-1 of FIG. 7 in a tube of material resistant to heat treatments (silica, ceramic).

Thus, according to the at least two non-parallel transmission axes, the bars are grouped (Panel 7-2 of FIG. 7) to form a block of square section (Panel 7-3 of FIG. 7) or cylinder shape (Panel 7-4 of FIG. 7) comprising a large number of bars. The blocks of Panels 7-3 and 7-4 of FIG. 7 are arranged so as to form three volumes of orthogonal magnetization materials and having a symmetry relative to the center common to the three axes.

Figure 8A:
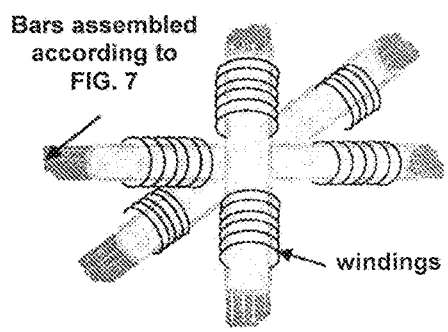
FIGS. 8A and 8B show examples of embodiments of transmission axes.

FIG. 8A shows how the assembled blocks of Panels 7-3 or 7-4 of FIG. 7 can be used: three windings are produced around three identical blocks that are then assembled mechanically to form three substantially perpendicular axes. The three coils are not concentric, which poses significant difficulties for finding the position of the three-axis sensor attached to the object the position and orientation of which is to be found. Therefore, preference will be given to concentric transmitting blocks according to FIGS. 8B and 9.

Figure 8B:
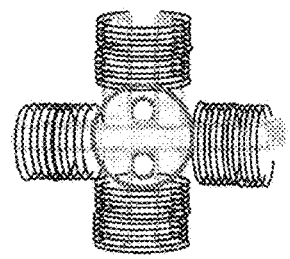
Figure 9:
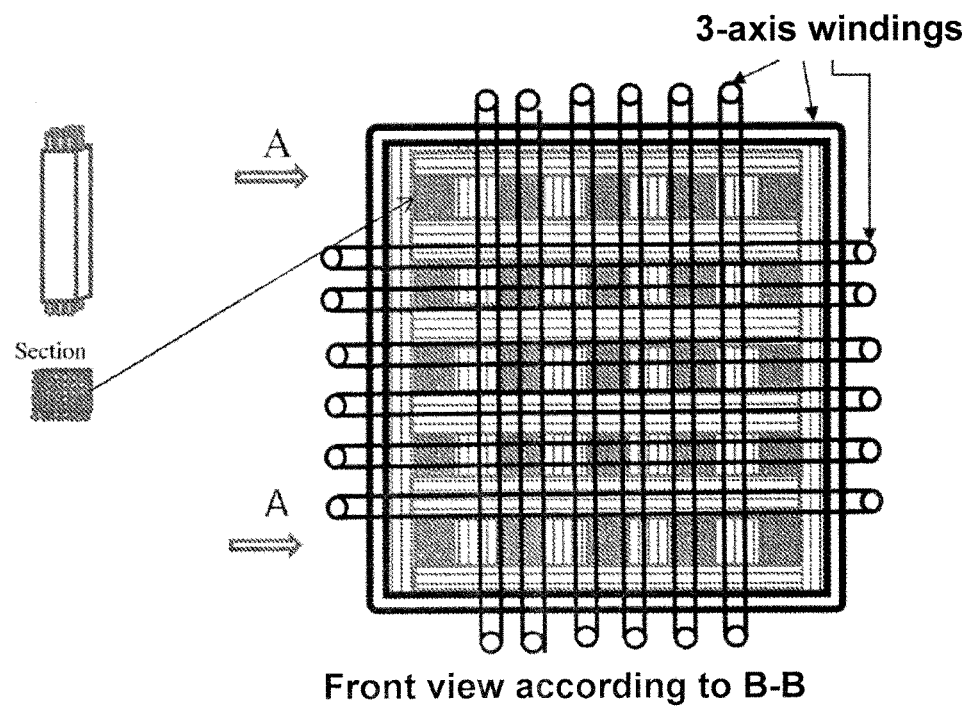
FIG. 9 shows a schematic view of a core installer according to the disclosure.
Figure 9:
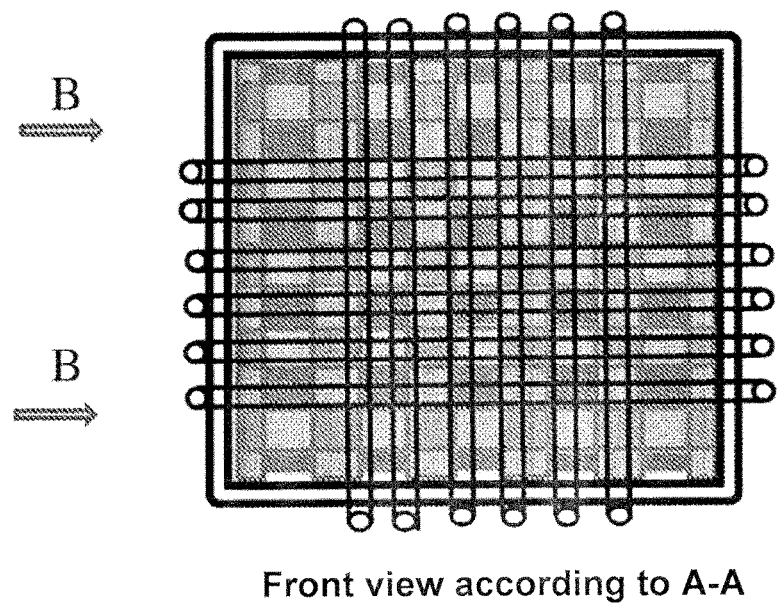

In FIG. 8B, preferable configurations of blocks are shown so that there is a center of symmetry of the three magnetized volumes and that each axis has a magnetic moment of similar value. FIG. 9 has two projection views of a preferred device that is a generalization of the preceding blocks: a plurality of blocks of type 2-3 are interlinked according to the three directions such that there is the best symmetry relative to a central point. According to FIG. 9, a cubic block is obtained on which three substantially orthogonal windings are arranged through which will pass the currents injected by the electronic circuits. So that the magnetic induction vector behaves in the space according to the equations of the dipole, in accordance with embodiments of the present disclosure, a block is produced, the external surface of which is similar to a sphere, by having the blocks shown in Panels 7-3 or 7-4 of FIG. 7 of shorter length when moving further away from the center.

A device consisting of producing three concentric spherical coils instead of the concentric cubic coils as shown in FIG. 9, and introducing the same overlap of blocks of the type shown in Panels 7-3 or 7-4 of FIG. 7 in the volume of the inner coil remains within the field of the invention.

Figures 10A, 10B:
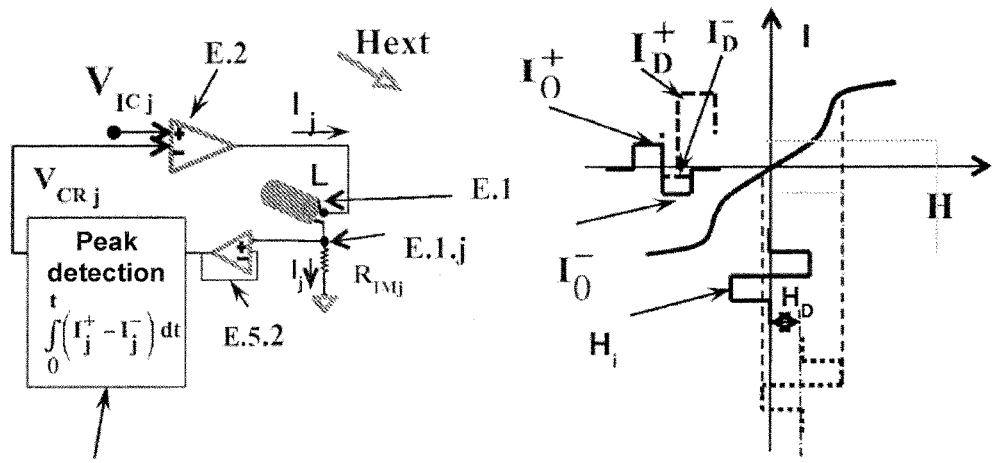
FIGS. 10A and 10B show schematic views of the field control.

Another aspect of the disclosure concerns the control at zero of the quasi-static magnetization produced by quasi-static disturbances, such as, for example, the earth's magnetic field. To avoid the saturation of the bars of blocks shown in Panels 7-3 or 7-4 of FIG. 7 in the presence of a continuous or quasi-continuous magnetization, the symmetry of the currents circulating in the coils is detected. FIG. 10A shows the operating principle: when a static or quasi-static field Hext is present in the environment, the projection $H_D$ thereof according to the transmission axis E.1 offsets the point of operation of the alternating excitation field $H_i$ produced by the coils according to the diagram in FIG. 10B. When the offset $H_D$ is zero, the difference between the peak values $I_0^+$ and $I_0^-$ is zero. If $H_D$ is not zero, the difference between the peak values $I_D^+$ and $I_D^-$ is not zero. This is due to the non-linearity of the magnetization curve of the ferromagnetic materials that modifies the inductance of the coil L depending on the excitation H sum of the external field $H_{ext}$ and of the excitation $H_i$ created by the current of the coils knowing that $L=\mu_r(H) \times L_0$ with $L_0$ inductance of the coreless coil. Exploitation of the impedance variation that deforms the current is carried out by the detection of the symmetry of the current circulating in the coil. The current through the resistance $R_{JMj}$ is measured at point E.1.j, j=1 to 3, by the impedance adapter amplifier E.5.2, the output voltage of which passes through a double peak detector E.5.1, which in a known manner detects the positive peak value $I_D^+$ and the negative peak value $I_D^-$. Then, the difference $I_D^+-I_D^-$ is filtered by a filter RC of the first conventional order, the cut-off frequency of which is a few Hertz. The output $V_{CRJ}$ of E.5.1 is then added to $V_{Icj}$, with the sign adapted according to the direction of winding so as to cancel out the field offset $H_D$. The symmetry of the current could also be detected by the creation of even harmonics of the current knowing that the symmetrical excitation Hi only has odd harmonics.

A. The on-Board Processor 4:

The computing processor is coupled with the three measurement assemblies C-1, C-2, C-3, previously described, in order to first produce at discrete times $t_k=k*Te$ the acquisition of signals, on one hand, by analog/digital conversion of the second receiving assembly C-1 as well as of the third sub-assembly E.3.1 of the first transmitting assembly E, on the other hand, by digital serial links of the third assembly for acquiring angular velocities C.3.1 at the frequency $F_{EG}$ as well as the angles of attitude of a second object M relative to the absolute fixed mark delivered by C.3.2. Second, to generate and produce digital/analog conversions by the block E.4 for providing the setpoints of the control of predetermined currents in the first transmitting assembly E. Third, to produce the computations of a first position/orientation from a complete model of the measured inductions, the variables of which are developed from the signals acquired and some parameters of which, identified by optimum filtering, represent the terms proportional to a dipolar or multipolar field model of which the position and orientation of the block C-1 are extracted. The block 4.3, receives, for example, from a conventional digital serial link that communicates with the inertial system of the platform, the information dated relative to the specific clock of processor 4 is constituted. If necessary, this makes it possible to temporally reset the attitudes of the platform. The block also receives the serial type digital information of the MEMS inertial sensor C-3-1.

B. Method for Extracting the Noise Reference:

If the equation [1] is used, $$\vec{B}_{TE} = \vec{B}_{EU} + \vec{B}_{EMI} + \vec{B}_{ECI} + \vec{B}_{FMI} + \vec{B}_T \qquad [7]$$

the useful signal $\vec{B}_{EU}$ is linearly dependent on the signals emitted by the transmitter block E. According to FIG. 4, the fields emitted by the axes E1 are measured by the block E3 previously described as the output of which is $Xu_j$. In other words, $Xu_j$ is the image of the magnetic field emitted by the axis j regardless of the non-linear amplification function provided by the magnetic cores. It can be noted that the sum of the ECI and FMI noises noted $B_{PCU}=\vec{B}_{ECI}+\vec{B}_{FMI}$ (PCU for disturbances correlated with U) are the noises correlated with Xu. The earth's magnetic field is presumed to be filtered by a known conventional filter not forming part of the invention. Concerning the EMI additive noises, for one particular embodiment of the invention, same are measured by the block C-2: as indicated in FIG. 3A, the block C-2 is fixed in the platform P, including a plurality of sensors installed in points such that i) the field emitted by the assembly E-1 is quasi zero or at the very least much lower than the point, contained in the volume of motion of the sensor, where C-1 of the mobile assembly M is situated, ii) the disturbance fields statistically not correlated with the fields emitted by E-1 and existing in the center of the sensor C-1 are very strongly correlated with said fields measured by C-2. The above notions are subsequently specified.

Consequently, it will be considered that the additive noise $\vec{B}_{EMI}$ measured in Nb points of the environment, by definition not correlated with the fields emitted estimated Xu has been noted $$\vec{B}_{RM}(t_k) = \vec{B}_{SC} + \vec{B}_R \qquad [8]$$

The signal $\vec{B}_{RM}(t_k)$ is shown in FIG. 4 by the analog signals Sb, which are output from the block C-2 and which are digitalized as the signals $Xu_j$ and $Sc_i$, j=1 to Ne, i=1 to Nc.

In some environments, such as, for example, airplanes, the noise $B_{EMI}$ is lower than in helicopter environments and, in particular, the noise $B_R$ is very low. In such a type of environment, the noise may have to be extracted instead of being measured. The definition of the block 4.4, therefore, enables a method for extracting the reference noise $B_{RM}(t_k)$ in two different manners:

i. First Method:

Either an extraction directly from the signal Sc (obtained by the acquisition of the signal provided by the first measurement assembly C-1). In this case, a choice is made by the processor in the block 4.4 depending on the nature of the magnetic noise. The choice ensues from an initial analysis of the magnetic noise of the environment when powered or at the request of the user. For example, when powering on, in the absence of signals emitted by the transmitting antenna, if the mean power density values of the measured signals are harmonic and of acceptable frequency stability (variation of 10% to 20% maximum of the mean frequency) and less than the mean power density level of the signals due to the emission of the transmitting antenna when same emits, the choice is made. The choice may also be made by the user following the accumulation of the experience that has been obtained from the environment or any other means. The choice requires the transmitting power to be zero during a period of time $T_{off}$, the period $T_{off}$ being interlinked between at least one transmission period of time $T_{obs}$ at power not zero, with $T_{off} < T_{obs}/2$. Two examples are given in FIG. 11. Over the period $T_{OFF}$ the stationary disturbance signals (low variability over $T_{OBS}$) are identified in the same manner as same that will be described for the extraction of the same signals on the signal Sb. The model of these signals $B_{sc}$ or $B_{ESC}$ (the letter $_E$ indicates that the vector is expressed in the transmitter mark)

$$B_{SC}(i_c, t_k) = \sum_{k_{sc}=1}^{N_{sc}} \hat{C}_{SC}^{re}(i_c, k_{sc}) \cdot \cos(\omega_{k_{sc}} t_k) + \hat{C}_{SC}^{im}(i_c, k_{sc}) \cdot \sin(\omega_{k_{sc}} t_k) \quad [9]$$

the frequencies $\omega_{k_{sc}}$ of which are estimated (by methods of the FFT type or preferably by methods of the High Resolution type). The coefficients are identified up to $T_{off}$.

Figure 11:
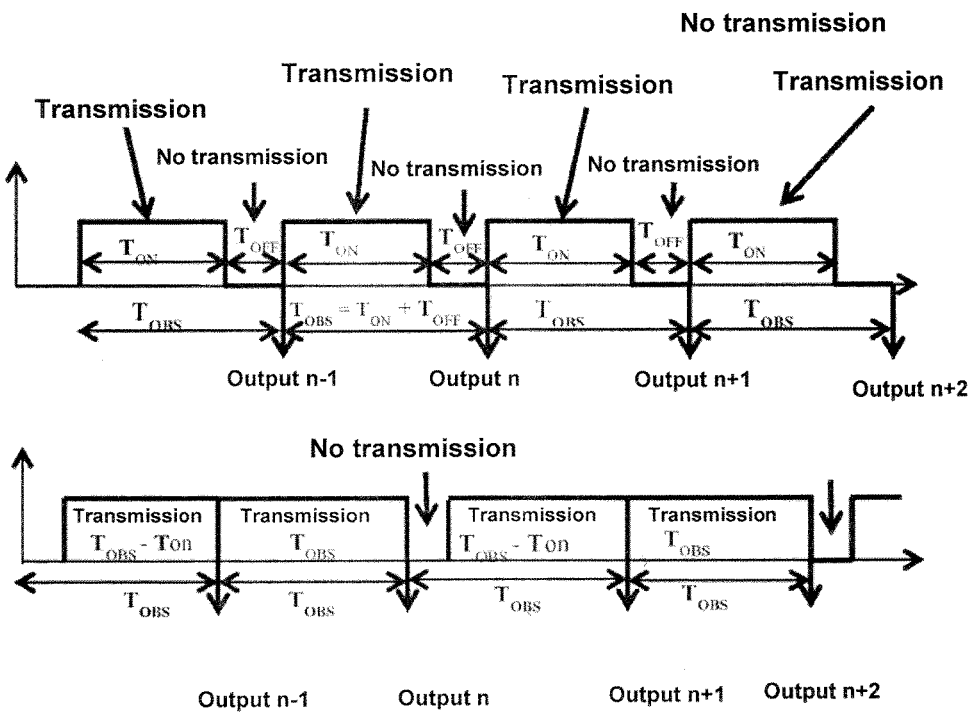
FIG. 11 shows the temporal transmission diagram.

As another example, two periods $T_{OFF}$ can be considered according to FIG. 11 outlining the period of transmission $T_{ON}$ to produce a linear interpolation of the parameters $\hat{C}_{SC}^{re}(i_c, k_{sc})$ and $\hat{C}_{SC}^{im}(i_c, k_{sc})$. The output information is therefore offset from $T_{ON}$, but the time may be very short if a HR (High Resolution) method is used to identify the equation [9].

The independent variables $X_C(t_k) = \cos(\omega_{k_{sc}}(t_k))$ and $X_S(t_k) = \sin(\omega_{k_{sc}}(t_k))$ are deduced therefrom during the period $T_{ON}$. The variables can be grouped under the term of $X_{sc}$, which becomes a matrix $[N_{obs}, 2]$ where $N_{obs}$ is the number of samples acquired during $T_{ON}$: $N_{obs} = T_{ON} * Fe$. The variables are added to the variables $Xu_1$ to form a model relatively linear to independent variables $X_{Uj}$, $X_{sc}$. Each component $i_c$ of the sensor C-1 may be written as follows, if $B_R$ is negligible:

$$B_E = \hat{B}_{EC}(i_c, t_k) + \hat{B}_{RM}(i_c, t_k) \quad [10]$$

with $$\hat{B}_{EC}(i_c, t_k) = \sum_{j=1}^{N_e} \sum_{k_{i_c}=0}^{N_{i_c}} \hat{A}_C(i_c, j, k_{i_c}) \cdot X_C(i_c, j, k_{i_c}) \quad [11]$$

where $X_C(j, k_{i_c}, t_k) = X_{U_j}(t_k - k_{i_c} Te)$ [10] is written:

$$B_E = \sum_{j=1}^{N_e} \sum_{k_{i_c}=0}^{N_{i_c}} \hat{A}_C(i_c, j, k_{i_c}) \cdot X_C(i_c, j, k_{i_c}) + \sum_{k_{sc}=1}^{N_{sc}} \hat{C}_{SC}^{re}(i_c, k_{sc}) \cdot \cos(\omega_{k_{sc}} t_k) + \hat{C}_{SC}^{im}(i_c, k_{sc}) \cdot \sin(\omega_{k_{sc}} t_k) \quad [10\text{-bis}]$$

It is noted that $X_C(j, k_{i_c}, t_k)$ are the values offset over time of the fields emitted by the transmitter on each axis j and for each component $i_c$ of the sensor of the block C-1. In a way, the estimator is a transversal filter that is justified by the fact that the ECI and FMI disturbances may be considered as the output of filters substantially of the first order of which the input are the signals $X_{Uj}(t_k)$.

The indexes $K_{ic}$ are relative to the delays of the independent variables of the model and range from 0 to $Ni_c$, the latter index $N_{ic}$ being defined strictly necessary in order to minimize the residual error. The offset terms of $K_{ic}$ form a transversal filter. $B_{RM}$ is written in the form of a development of complex variables:

$$\hat{B}_{RM}(i_c, t_k) \cong \hat{B}_{SC}(i_c, t_k) = \sum_{k_{sc}=1}^{N_{sc}} \hat{C}_{SC}(i_c, k_{sc}) \cdot X_{sc}(t_k) \quad [12]$$

Equations [11] and [12] are linear relative to the parameters to be estimated.

If a model was produced for $X_{sc}(t_k)$ of the same type as [11], i.e., a development sum of the type [12] for each variable $X_{sc}(t_k - k_{sc} \cdot T_e)$, this would remain within the field of the invention. The same would apply if the complex parameters $\hat{C}_{SC}(i_c, k_{sc})$ were no longer constant but depended on the time in the form of a polynomial of the time $$\hat{C}_{SC}(i_c, k_{sc}, t_k) = \sum_{io=0}^{io=N_{io}} C_{io}(i_c, k_{sc}) \cdot t_k^{io}.$$

For the temporal model, the values of the terms $C_{io}$, $(i_c, k_{sc})$ are computed by developing same in [12]. Any type of different temporal model no longer comprised of temporal polynomial but of sums of functions of the time of exponential type $e^{a \cdot t}$ or $e^{i \cdot b \cdot t}$ (complex periodic function $\Leftrightarrow i^2 = -1$) remains within the field of the invention.

The parameters of the model are determined by a conventional method of least squares (MSE) or an equivalent recursive method (LMS, RLS). The estimation of the parameters relative to the variables $Xu_j$ may be refined by subtracting the term $\hat{B}_{SC}(i_c, t_k)$ estimated at the signal $\hat{Sc}(i_c, t_k)$. The new estimation makes it possible to estimate the correlated terms with better accuracy after one or two iterations. The reference noise $\hat{B}_{RM}$ is in this case the signal $\hat{B}_{sc}$ estimated in the preceding iteration.

ii. Second Method:

The continuous measurement of disturbance signals by $S_b$ may be essential in the presence of very strong harmonic signals of non-constant amplitudes and frequencies up to $T_{obs}$ but also in the presence of non-stationary deterministic disturbances or random disturbances, i.e., an estimation of the signals radiated by the measurement of the signals $S_b$. As described and illustrated in FIG. 4, the signal noted $S_b$ consists of signals coming from at least one magnetic sensor of one to three orthogonal axes for measuring the magnetic fields between the continuous and a few KHz (fluxgate sensor, fluxmeter, AMR, GMR, TMR, etc.), the sensors being attached to the second object in at least Nb points measure the vector sum of the magnetic inductions present in the Nb points of the environment, sufficiently far enough away from the first transmitting assembly so that the assembly constitutes a noise reference $B_{RM}(t_k)$ by preferentially measuring the magnetic inductions independent of the inductions generated by the first transmitting assembly E1. Measurements may be produced without interruption ($T_{off} = 0$).

The measurements of the additive noise $B_{EMI}$ are identified by the output signals $S_b$ of the block C-2 of FIG. 4. In a particular embodiment, in order to facilitate the drafting, Nb=1 will be taken and it will be considered that the measurement of a single component is sufficient. The measurement of $\vec{B}_{RM}(t_k)$ according to a particular direction will be noted to be considered as a signal very strongly correlated with $B_{EMI}$. In the ideal situation, the measured noise reference $B_{RM}$ contains no signal correlated to $Xu_j$, $j=1$ to 3. In practice, it is very difficult to arrange sensors C-2 at locations such that no component correlated with $X_U$ exists, including and in particular the signals $B_{ECI}$ and $B_{FMI}$. Therefore, the signal for measuring the noise $S_b$ consisting of the same components as the signal $S_c$ must be considered. Therefore, the same problem arises as in i), i.e., that the various components of the signal $S_b$ must be identified that are written as follows:

$$B_{C2} = B_{RU} + B_{RM} \quad [13\text{-}a]$$

with $B_{RU} = B_U + B_{PCU}$ [13-b]

where $B_U$ is linearly dependent on $X_{Uj}(t_k)$, $B_{PCU}$ is linearly dependent on $X_{Uj}$ (t−k·Te) and $$B_{RM} = B_{SC} + B_R \quad [14]$$

is the term not correlated with $X_{Uj}$.

$B_{RM}$ is not negligible as in i) and this consists of extracting from [13-a] the portion $B_{RM}$. As in the case i), all of the terms of the model must be identified to prevent biasing the estimation of the parameters of the model. However, the random signal $B_R$ is in general weaker than $B_{SC}$ and $B_{cu}$, and the identification may be performed over longer times insofar as the sensors of C-2 are immobile. It can also be considered that, since the transmitter and the sensor(s) of the block C-2 are fixed on the same structure, the identification of the parameters of the model [14] may be carried out once for all, or indeed at the start of use of the system during an initialization phase of sufficient duration in order to enable very good accuracy in the estimation of the parameters following filtering of the terms of [14], which are not correlated with [14]. The identification is exactly the same as that described in [10], [11], [12]. The parameters of [14] are, therefore, stored in memory for the computation of $\hat{B}_{CU}$. The principle of extraction of $B_{RM}$ consists of writing:

$$\hat{B}_{RM} = B_{C2} - \hat{B}_{RU} \quad [16\text{-}a]$$

where $\hat{B}_{RU}$ are the estimates of the signals correlated with $Xu_j$.

After the identification of the model of the type:

$$B_E = \sum_{j=1}^{N_e} \sum_{k_{i_c}=0}^{N_{i_c}} \hat{A}_C(i_c, j, k_{i_c}) \cdot X_C(i_c, j, k_{i_c}) +$$

$$\sum_{k_{sc}=1}^{N_{sc}} \hat{C}_{SC}^{re}(i_c, k_{sc}) \cdot \cos(\omega_{k_{sc}} t_k) + \hat{C}_{SC}^{im}(i_c, k_{sc}) \cdot \sin(\omega_{k_{sc}} t_k)$$

All of the terms of the signals correlated with $Xu_j$ are extracted therefrom to form the signal $\hat{B}_{RU}$:

$$\hat{B}_{RU}(i_c, t_k) = \sum_{j=1}^{N_e} \sum_{k_b=0}^{N_b} \hat{A}_{BRC}(i_c, j, k_b) \cdot X_C(i_c, j, k_b) \quad [16\text{-}b]$$

$\hat{B}_{RM}$ of [16-a] is, therefore, the estimate of the noise not correlated with the emitted fields.

It is, therefore, noted that when there is emission of signals by E-1, in the two embodiments i) and ii), previously described, the same model should be identified on the measurements Sc (coming from the block C-1) or $S_b$ (coming from the block C-2).

The model of the signal to be identified within the framework of the second embodiment of the invention for which a measurement of the EMI noise is taken, and of which only the BRM noise is extracted, is, therefore, produced.

The model of $B_c$ is developed which is the field measured by the sensor C-1:

$$\vec{B}_C = R_{C/E}{}^t(\vec{B}_{U/E} + \vec{B}_{CU/E} + \hat{\vec{B}}_{RM/E}) \quad [17]$$

In the index $_{U/E}$, $_E$ indicates that the vector is expressed in the mark of the transmitter (the index is sometimes omitted by simplifications knowing that the context indicates in which mark the fields are expressed), $_U$ indicates that this is the portion of the field linearly dependent on the fields emitted by the transmitter $X_U$. The index $C_U$ indicates that $\vec{B}_{CU/E} \equiv \vec{B}_{ECI} + \vec{B}_{FMI}$ represents the vector of the disturbances correlated with the vector $X_U$. $\vec{B}_{CU/E}$ could be modelled by the convolution of $\vec{B}_{U/E}$ by the impulse response of the complex filter existing between the two magnitudes. $\hat{\vec{B}}_{RM/E}$ has the same meaning as in [13] and [15], it is the noise present in the environment not correlated with the emitted fields.

$B_T$, which is overlooked, is presumed to be filtered by a conventional digital filter known by the person skilled in the art. The three models are developed linearly relative to the parameters to be identified, for example, by a conventional square error minimization method. When the coefficients are determined, the nine terms (three terms due to each transmission channel for each component of the triaxial sensor C-1) are extracted relative to $X_U(t_k)$ components of the matrix noted "A," which will be better defined subsequently. The fundamental interest of the complete modelling of the signals received by the sensor C-1 lies in the fact that the nine parameters of A are even less biased if the independent variables of the model more accurately represent the physical phenomena.

The following three models of [17] are developed: Model $\vec{B}_{U/E}$, Model $\vec{B}_{CU/E}$, Model $\vec{B}_{RM/E}$:

Model $\vec{B}_{U/E}$:

Consequently, it is considered that the sensor C-1 has been corrected of the errors thereof according to known methods: the functions of gain correction, misalignment, etc., are applied. Presuming that the distance between the sensor C-1 and transmitter is at least three times the largest dimension of the transmitter, it is therefore written in a known manner that the model is of dipolar type and is written $$B_C(t) = [R_{c/e}(t)]^t [P]^t [H] [P](M_1 f_1(t) + M_2 f_2(t) + M_3 f_3(t)) \quad [18]$$

$$H = \frac{\begin{bmatrix} 2 & 0 & 0 \\ 0 & -1 & 0 \\ 0 & 0 & -1 \end{bmatrix}}{D_{C/E}^3} \quad [19]$$

$D_{C/E}$ is the distance between the center $0_C$ of the sensor C-1 and the center of the transmitter $0_e$:

$$O_E \vec{O}_C \triangleq D_{C/E} \cdot \vec{u}, \quad [19\text{-bis}]$$

$D_{C/E}$ is variable as a function of time, like the rotation $R_{C/E}(t', \vec{u})$: unit vector of $\overrightarrow{O_E O_C}$ expressed in the reference mark of the transmitter $R_E$ that is mechanically defined in a known manner by the person skilled in the art relative to the mark of the platform $R_p$ according to FIG. 2.

P is the transfer matrix between the mark of the transmitter and the mark $(\vec{u}, \vec{v}, \vec{w})$ with $\vec{w} = \vec{u}_M \wedge \vec{u}$ and $\vec{v} = \vec{w} \wedge \vec{u}$ and known as the radial mark, where $\vec{u}_M$ is the unit vector of a transmission axis. It is also shown that, for example:

$$\text{If } \vec{u} = \begin{vmatrix} x \\ y \\ z \end{vmatrix} \text{ then } \vec{v} = \frac{1}{\sqrt{y^2 + z^2}} \begin{vmatrix} -(y^2 + z^2) \\ xy \\ xz \end{vmatrix}, \quad [20]$$

-continued $$\vec{w} = \frac{1}{\sqrt{y^2 + z^2}} \begin{vmatrix} 0 \\ -z \\ y \end{vmatrix}$$

and $$P = [\vec{u} \; \vec{v} \; \vec{w}] \quad [21]$$

In [18], $$M_1 = m_1 f_1(t) \begin{vmatrix} \alpha_1 \\ \beta_1 \\ \gamma_1 \end{vmatrix} \quad M_2 = m_2 f_2(t) \begin{vmatrix} \alpha_2 \\ \beta_2 \\ \gamma_2 \end{vmatrix} \quad M_1 = m_3 f_3(t) \begin{vmatrix} \alpha_3 \\ \beta_3 \\ \gamma_3 \end{vmatrix} \quad [22]$$

are the dipolar moments of the transmitting coils, the amplitude of which change substantially over time according to the functions $f_1(t), f_2(t), f_3(t)$ imposed by the currents circulating in the coils.

$m_1, m_2, m_3$ are the multiplicative terms of amplitudes of the magnetic moments that depend on the units chosen, the gains of the current amplifiers E-2, $\alpha_i, \beta_i, \gamma_i$ the direction coefficients (cosines) of the collinear unit vectors of the magnetic moments (axes of revolution) of the coils, and $f_1(t), f_2(t), f_3(t)$ represent the variations of the standardized measurements proportional to the magnetic inductions emitted over time by each transmitting coil. The measurements of emitted inductions are taken by the sensors E-3, secured to the transmitter E, as shown in FIG. 4, and are proportional to $_L$. The output $V_{E3}$ of the sensors E-3 is either digitalized by the CAN block of the processor for the three axes and digitally incorporated into therein, or, according to a preferred mode of embodiment of FIG. 4, it is first incorporated by an analog amplifier E-3-2, then digitalized by the CAN 4-1 of the processor 4 and each of the channels is standardized by a coefficient determined in the factory in a manner known by the person skilled in the art, such that the values thus standardized correspond to the physical units and to the nominal values thereof. The coefficients $\alpha_i, \beta_i, \gamma_i$ are determined in the factory by calibration procedures on factory test bench using methods known by the person skilled in the art.

The functions $\vec{X}_U = [X_{U1}, X_{U2}, X_{U3}]^t$ thus digitalized, proportional to the functions $f_1(t), f_2(t), f_3(t)$ are therefore the images of the fields emitted by the three coils: by re-writing [18], if $\vec{X}_P$ is the vector $\overrightarrow{O_E O_C}$ $$B_C(t) = [R_{c/e}(t)]^t B(\vec{X}_P)[M_1 X_{U1}(t) + M_2 X_{U2}(t) + M_3 X_{U3}(t)]$$

$$B(\vec{X}_P) = [P][H][P]^t \quad [23]$$

Or again if it is noted $A = [R_{c/e}(t)]^t B(\vec{X}_P)$  [23-bis]

$$Bc(t) = [A] \cdot \left[ X_{U1}(t) \cdot m_1 \cdot \begin{vmatrix} \alpha_1 \\ \beta_1 \\ \gamma_1 \end{vmatrix} + X_{U2}(t) \cdot m_2 \cdot \begin{vmatrix} \alpha_2 \\ \beta_2 \\ \gamma_2 \end{vmatrix} + X_{U3}(t) \cdot m_3 \cdot \begin{vmatrix} \alpha_3 \\ \beta_3 \\ \gamma_3 \end{vmatrix} \right] \quad [24]$$

$$Bc(t) = \begin{bmatrix} (A_{11}\alpha_1 + A_{12}\beta_1 + A_{13}\gamma_1)m_1 f_1(t) + (A_{11}\alpha_2 + A_{12}\beta_2 + A_{13}\gamma_2)m_2 f_2(t) + (A_{11}\alpha_3 + A_{12}\beta_3 + A_{13}\gamma_3)m_3 f_3(t) \\ (A_{21}\alpha_1 + A_{22}\beta_1 + A_{23}\gamma_1)m_1 f_1(t) + (A_{21}\alpha_2 + A_{22}\beta_2 + A_{13}\gamma_2)m_2 f_2(t) + (A_{21}\alpha_3 + A_{22}\beta_3 + A_{33}\gamma_3)m_3 f_3(t) \\ (A_{31}\alpha_1 + A_{32}\beta_1 + A_{33}\gamma_1)m_1 f_1(t) + (A_{31}\alpha_2 + A_{32}\beta_2 + A_{33}\gamma_2)m_2 f_2(t) + (A_{31}\alpha_3 + A_{32}\beta_3 + A_{33}\gamma_3)m_3 f_3(t) \end{bmatrix} \quad [25]$$

This gives three equations to each three unknowns, i.e., nine terms to be identified. Measuring the three components of $B_c$, when there are no disturbances $B_{CU}$ and $B_{RM}$ of [17], the nine terms of $\vec{X}_U = [X_{U1}, X_{U2}, X_{U3}]^t$ are identified using a conventional least square method (MSE) or an equivalent recursive method (LMS, RLS).

Therefore, the matrix W is obtained which can be applied in the foil of:

$$W = \begin{bmatrix} A_{11} & A_{12} & A_{13} \\ A_{21} & A_{22} & A_{23} \\ A_{31} & A_{32} & A_{33} \end{bmatrix} \begin{bmatrix} \alpha_1 & \alpha_2 & \alpha_3 \\ \beta_1 & \beta_2 & \beta_3 \\ \gamma_1 & \gamma_2 & \gamma_3 \end{bmatrix} \begin{bmatrix} m_1 & 0 & 0 \\ 0 & m_2 & 0 \\ 0 & 0 & m_3 \end{bmatrix} \quad [26]$$

i.e. $W = [A] C_E K_E$

The two matrices, $C_E$ and $K_E$ (gains and misalignments) relative to the transmitting block E-1, are identified in the factory, therefore, the matrix A sought is easily obtained.

$$[A] = W[C_E K_E]^{-1} \quad [27]$$

Knowing A, the position $\vec{X}_P$ of the center of the sensor in the transmitter mark and the rotation $R_{C/E}$ (or direction cosines of the axes of the sensor in the transmitter mark) are obtained according to the methods of prior art. Through the identification of the matrix consisting of the coefficients of the functions of $\vec{X}_{CU} = [X_{U1}, X_{U2}, X_{U3}]^t$, the demultiplexing of the transmitting channels was thus carried out by identification of a model, and not by temporal demultiplexing (emissions not simultaneous), or by frequential demultiplexing (U.S. Pat. No. 6,754,609 to Lescourret and U.S. Pat. No. 6,172,499 to Ashe) or any other demultiplexing.

Model $\vec{B}_{CU/E}$:

As already seen, $\vec{B}_{CU/E}$ may be considered as the output of a linear filter, the input of which are the inductive fields emitted by E1 and the output is the measurement by the sensor C-1. It is therefore still possible to consider that the output at instant $t_k$ is a linear combination of the inputs at instants $t_k-k_l \cdot Te$. If it is noted: $\vec{X}_{CU}(t_k-k_lT_e)=[X_{U1}(t_k-k_lT_e), X_{U2}(t_k-k_lT_e), X_{U3}(t_k-k_lT_e)]^t$, for each component $i_c$ ($i_c=1$ to 3) of the sensor C-1, the following model is formed:

$$B_{CU/E}(i_c, t_k) = \sum_{j=1}^{N_e} \sum_{k(i_c)=0}^{N(i_c)} A_{cu}(i_c, j, k_{i_c}) X_{cu}(j, t_k - k(i_c)Te) \quad [28]$$

In general, in the environments of cockpits, there are practically no ferromagnetic materials, the FMI effects are therefore low in particular for the high frequencies and in addition vary substantially in $1/(D_{P/E}^3 D_{C/P}^3)$ where $D_{P/E}$ is the transmitter-disturber distance and $D_{C/P}$ the disturber-sensor C-1 distance. When it is possible to ignore same, the ECI disturbers are the only disturbers of which the model can be written as a function of the shifts of the emitted fields:

$$\vec{X}'_{CU}(t_k - k_1T_e) = [X'_{U1}(t_k - k_1T_e), X'_{U2}(t_k - k_1T_e), X'_{U3}(t_k - k_1T_e)]^t \quad [29]$$

With $$X'_{Uj}(t_k) \approx \frac{(X_{Uj}(t_k) - X_{Uj}(t_k - T_e))}{Te}$$

Model $\vec{B}_{RM/E}$:

The reference noise extracted from the signals Sb is $\hat{\vec{B}}_{RM} = \hat{\vec{B}}_{C2} - \hat{\vec{B}}_{CU}$. If the variable is called $X_{BR}(t_k) = \hat{\vec{B}}_{RM}(t_k)$, and to take into account the transfer functions between sensors, the model of the ambient noise for each component $i_c$ of the sensor C-1: $B_{EM1}(i_c, t_k)$, may be applied in the form of a function of the variables $X_{BR}(t_k-k_bT_e)$:

$$\hat{B}_{RM}(i_c, t_k) = \sum_{k_b=0}^{k_b=N_{kb}(i_c)} C_b(k_b, i_c) X_{BR}(t_k - k_b T_e) \quad [30]$$

Complete Model:

The complete model [17] is written for each component of $$B_C(i_c, t_k) = \sum_{j=1}^{N_e} \sum_{k(i_c)=0}^{N(i_c)} A_{CU}(i_c, j, k_{i_c}) X_{CU}(j, t_k - k(i_c)Te) + \quad [31]$$

$$\sum_{k_b=0}^{k_b=N_{kb}(i_c)} C_b(k_b, i_c) X_{BR}(t_k - k_b T_e)$$

The number of coefficients and the number of variables are in the number of $Ne*Max_{i_c}(N(i_c))$.

The nine terms of $A_{cu}(i_c,j,0)$ are the terms of the model in free space, i.e., without disturbers.

Once all of the coefficients are estimated using a conventional least squares method (MSE) or an equivalent recursive method (LMS, RLS, Kalman, etc.) at each transmission cycle $T_{obs}$, the terms $A_{cu}(i_c,j,0)$ relative to the variables $X_{Uj}(t_k)$ form a 3×3 matrix identical to W of [26] and which are the coefficients of the model in free space, since same only represent the inductive fields. As indicated above, the first position and orientation are deduced therefrom at instants $t_k$ from the magnetic detector insensitive to disturbances. The insensitivity to disturbances arises from the fact that the disclosure implements a complete model of useful signals and measured and estimated noises, a model for which the coefficients are not biased due to the completeness of the model.

Figure 12A:
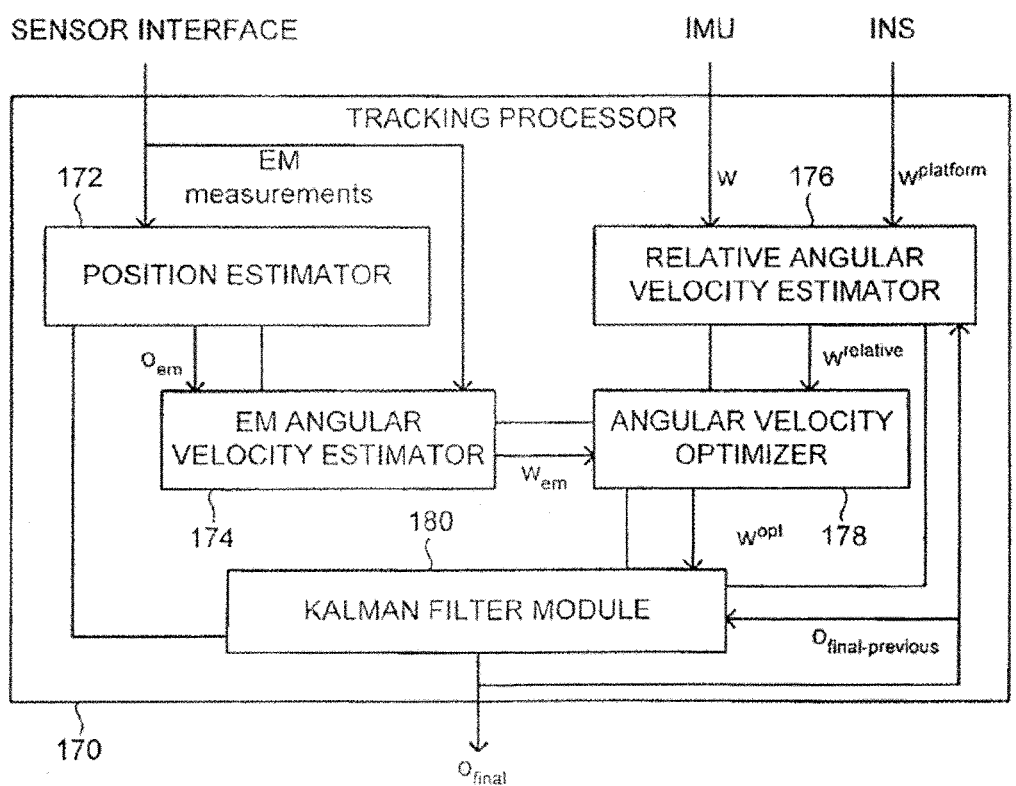
FIGS. 12A and 12B show schematic views of magnetic-inertial hybridization and an inertial extrapolator.

The P/O$_{EM}$ information according to FIG. 12A of the insensitive magnetic orientation and position tracker system known as IM tracker, i.e., the position of the center of the sensor $X_{C/E}(t_n)$ and the rotation $R_{C/E}(t_n)$ of the sensor C-1 are known at instants $t_n=n*T_{obs}$, n being a positive integer: effectively, the identification of the coefficients of the equation [31] being carried out by the computing block 4-4 is performed on $N_{obs}$ points acquired at instants $t_k$ with $t_n-t_{n-1}=T_{obs}$. The latency of the information provided is of $T_{obs}/2$.

C. Inertial and Magnetic Hybridization

One of the aims of the disclosure is presented hereafter, which consists of compensating the latency of a position/orientation tracker system. The example described concerns a magnetic system but would be applied to any system for detecting the orientation of a mobile body.

Figure 12B:
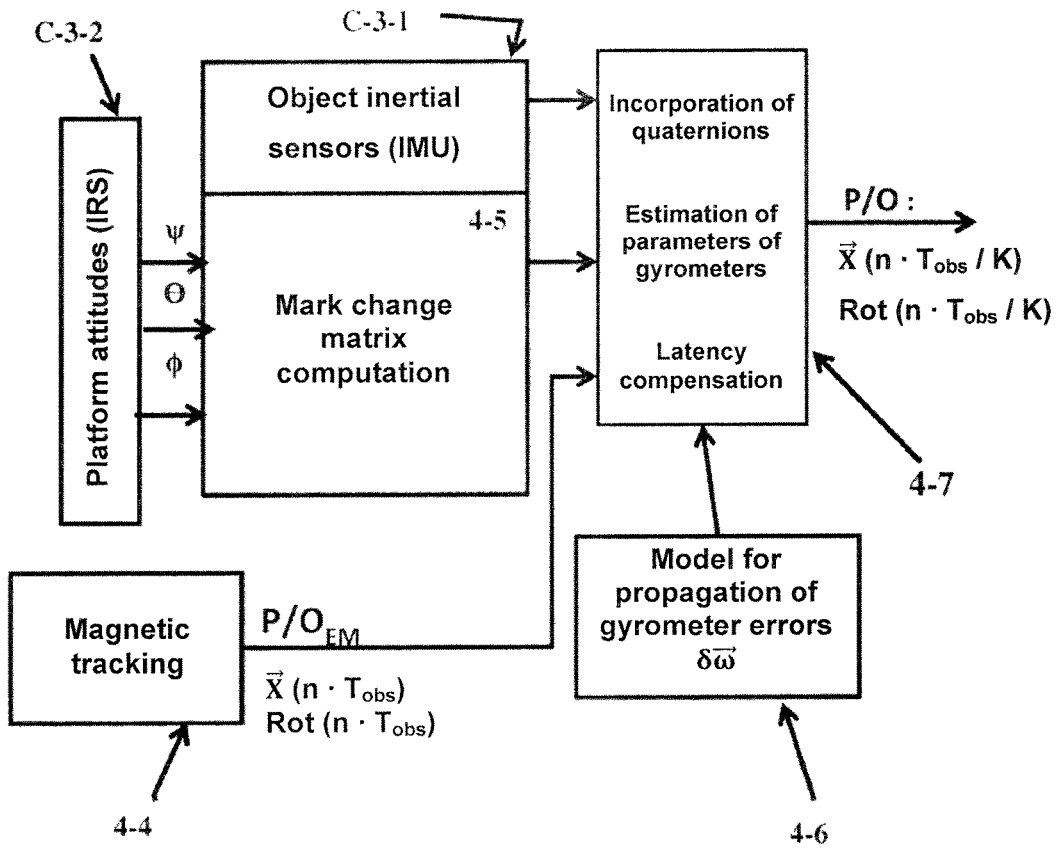

When the signal-to-noise ratio input from the magnetic detection system is not sufficient, either that noise exists that is not taken into account by the model or that noise is added on the sensor C-1, one method consists of increasing the number of points to further average the noise. Therefore, the latency is increased, which is relatively harmful for the piloting of aircraft. One aspect of the disclosure is to associate with the magnetic detection an inertial system, the excellent short-term properties of which are known, i.e., a very short response time, but having long-term shifts, in particular due to bias and bias shifts. The magnetic tracker means has an excellent long-term stability but a response time related to the signal-to-noise ratio, which may be insufficient in some conditions. The principle of the disclosure consists of associating, also called hybridizing, the magnetic system and the inertial system, when the platform has an inertial unit providing the attitude of the platform at any instant within a fixed inertial reference frame. FIG. 12A indicates prior art that consists of using the angular velocities measured on the mobile object and also on the platform in order to be processed in a Kalman filter. FIG. 12B describes the principle of the disclosure that consists of measuring the angular velocities of the mobile object M, and digitally incorporating same in a known manner from time $t_i$ (initial time) to time $t_f$ (final time) to obtain the rotation of the mobile between the two instants in the fixed mark. The acquisition of angular velocities is carried out by the block C-3-1 in FIG. 3A, consisting of a MEMS sensor delivering digitalized angular velocities at a specific speed $T_g$ which is a sub-multiple of $T_{obs}$: $T_g=T_{obs}/k_g$, $k_g$ is a positive integer, $t_i$ is, for example, the fraction of time that follows the instant of arrival of the information from the magnetic tracker means $t_n$, i.e., $t_n+t_f$ is the instant for which the information is desired. In the invention, there are two specific instants $t_f$. The first is the instant t, the second is the instant $t_n+T_{obs}$. This will be better understood later.

The rotation thus computed from the initial attitude of the gyrometric sensors C-3-1 at time $t_i$ is expressed within the fixed inertial reference frame shown by the mark $R_i$ in FIG. 2.

The information from the IM tracker means is available at the output of 4-4 and constitutes the first orientation known as $R_{ot}$ ($t_n=n\cdot T_{obs}$). The rotation is $T_{C/E}^{EM}(t_n)$, i.e., the rotation of the axes of the mark $R_M$ connected to the mobile object M according to FIG. 2 expressed in the mark of the transmitter. Knowing the transfer matrix from the transmitter to the platform $R_{E/P}$ by a measurement during installation of the transmitter in the platform and the transfer matrix of $R_M$ at the mark of the sensor C-1: $R_{C1}$, the person skilled in the art knows how to compute the rotation of the mark $R_M$ relative to $R_P$, i.e., $R_{M/P}^{EM}$. To process the magnetic and inertial information, it is necessary to express same in the same mark, for example, the mark $R_i$. Therefore, $R_{M/I}^{EM} = R_{P/I} R_{M/P}^{EM}$ must be computed. For this, it is necessary to know $R_{P/I}$, which is none other than the direction cosine matrix of the platform that is provided by the inertial unit C-3-2 of the platform, in general, in the form of three Euler angles, Yaw $\psi$, Pitch $\ominus$ and Roll $\varphi$, from which, $R_{P/I}$ then $R_{M/I}^{EM}$ are computed.

The direction cosines of the gyrometers are deduced therefrom in the inertial frame at time $t_i = t_n$ by the formula:

$$R_{g/i}^{EM}(t_n) = \hat{R}_{P/i}(t_n) \cdot R_{M/P}^{EM}(t_n) \cdot R_{g/m} \quad [32]$$

where $R_{g/m}$ is the constant matrix defining the direction cosines of the gyrometers in the mobile mark M. The quaternion $Q(t_n)$ is deduced from $R_{g/i}^{EM}(t_n)$.

The quaternion $Q(t_{kg} = t_n + k_g \cdot T_g)$ obtained by digital incorporation of the equation of the type $\dot{Q} = F(\omega)Q$ or in the incorporated form thereof:

$$\hat{Q}(t_{kg}) = \int_{t_n}^{t_{kg} = t_n + k_g \cdot T_g} \frac{F(\hat{\omega}(u)) \cdot Q(u)}{2} \text{ of the} \quad [33\text{-a}]$$

With the initial condition: $\hat{Q}(t_n) = \hat{Q}_i(t_n)$ [33-b]

It will be seen that initial conditions are the value of the state predicted by the model at $t_n$ to which is added a fraction of the error between estimated measurement and real measurement.

$$F(\hat{\omega}(u)) = \begin{pmatrix} 0 & -\hat{\omega}_x(u) & -\hat{\omega}_y(u) & -\hat{\omega}_z(u) \\ \hat{\omega}_x(u) & 0 & +\hat{\omega}_z(u) & -\hat{\omega}_y(u) \\ \hat{\omega}_y(u) & -\hat{\omega}_z(u) & 0 & +\hat{\omega}_x(u) \\ \hat{\omega}_z(u) & +\hat{\omega}_y(u) & -\hat{\omega}_x(u) & 0 \end{pmatrix} \quad [33\text{-c}]$$

Where $\vec{\omega} = \vec{\omega}_m - \vec{\delta\omega}$, [33-d]

calculated from the values provided by the gyrometers and corrected of the errors of the gyrometers $\vec{\delta\omega}$ estimated by an optimal estimator of the Kalman type (extended: EKF or "unscented": UKF) or sub-optimal ("Recursive least squares" of the type LMS, RLS, etc.) according to a model of errors of the type:

$$\vec{\delta\omega} = \hat{b}_\omega + \Delta K \cdot \vec{\omega} \quad [34]$$

where $\vec{\omega}_b$ is a random bias and K is the matrix of gain, misalignment and coupling errors between channels.

The propagation of gyrometric errors is carried out by a dynamic model of the terms of $\vec{\delta\omega}$, same incorporated as is known to be carried out with a Kalman filter. By calling dQ the error between the value $Q_i^{EM}(t_n)$ computed by the magnetic tracker means at time $t_n$ and $Q(t_n)$ incorporated from t to $t_n$, the propagation state vector of the errors is for example of the type:

$$X = [Q^t \; dQ^t \; b_\omega^t \; \Delta K^t]^t : \dot{Q}\frac{1}{2}F(\hat{\omega}_{(t)})Q(t) \quad [35]$$

$$d\hat{Q} = \frac{1}{2}F(\hat{\omega})d\hat{Q} + \frac{1}{2}C(\hat{Q})\vec{\delta\omega} \quad [36]$$

$$\dot{\vec{b}}_\omega = Vg \text{ ou } \dot{\vec{b}}_\omega = -\frac{1}{Tg}\vec{b}_\omega + Vg \quad [37]$$

$$\Delta\dot{K} = V_K \text{ ou } \Delta\dot{K} = -\frac{1}{T_k}\Delta K + V_K \quad [38]$$

$$\hat{Y} = d\hat{Q} \quad [39\text{-a}]$$

$$Y = dQ + v \text{ measures} \quad [39\text{-b}]$$

With $$C(Q) = \begin{bmatrix} -Q_1 & -Q_2 & -Q_3 \\ +Q_0 & -Q_1 & +Q_2 \\ +Q_3 & +Q_0 & -Q_1 \\ -Q_2 & +Q_1 & +Q_0 \end{bmatrix} \quad [40]$$

v, Vg, Vk are superimposed additive Gaussian noises centered according to the characteristics of the fluctuations of the terms $\vec{b}_\omega$ and K of [38-a and 38-b] and the error provided by the magnetic detection system.

Equations [35] to [38] may be digitally incorporated in various manners or be applied in the form of recurrent matrix equations. At each instant $t_n$, the parameters of $\vec{\delta\omega}$ are reset using formulas known by the person skilled in the art depending on the filter chosen, for example, the Kalman filter.

In this hypothesis, the resetting formula is of the type:

$$X(t_n^+) = X(t_n^-) + K_n(Y - \hat{Y}) \quad [41]$$

If the Kalman filter (of the standard or extended (EKF) or unscented (UKF) type is used, $K_n$ is obtained using well-known formulas (prediction and resetting of the covariance matrix). If $K_n = 1$, the prediction model is not trusted: resetting consists of initializing the incorporation with $\hat{Q}_i^{EM}(t_n)$. If $K_n = 0$, the measures are not trusted, which are not taken into account. Adjustment of the gain does not form part of the disclosure, in particular because it depends a great deal on experimental conditions (noise, quality of the sensors, etc.).

The compensation of the latency is performed in the following manner: After the resetting of the filter according to [41] at the instant $t_n^+$ the equations [35] to [38] are incorporated over a time $t_{kg} - T_{obs}/2$ up to $t_{kg}$ (the current time), by using the raw angular velocities stored in memory over the time interval, and corrected according to [33-d]. The initial value of Q is the value reset at $t_n^+$. A new value of $\hat{Q}(t_{kg})$ is obtained. Then, from $t_{kg}$ to $$t_{kg} + \frac{T_{obs}}{2},$$

at each new acquisition of $\vec{\omega}_m$, $\hat{Q}(t_{kg})$ is computed according to the same formulas [35] to [38] up to the new resetting value $Q(t_{n+1})$ date of the arrival of the new orientation of the tracker system (first orientation). Thus, the compensation has been carried out.

The direction cosine matrix $R_{g/i}(t_{kg})$ is computed defining the attitude of the gyrometers in the fixed mark and computed from the quaternion $\hat{Q}(t_{kg})=[q_0\ q_1\ q_2\ q_3]^t$ of [33] using the following formula:

$$R_{g/i} = \begin{bmatrix} q_0^2+q_1^2-q_3^2-q_4^2 & 2(q_1^2q_2^2-q_0^2q_3^2) & 2(q_1^2q_3^2+q_0^2q_2^2) \\ 2(q_1^2q_2^2+q_0^2q_3^2) & q_0^2+q_2^2-q_3^2-q_1^2 & 2(q_3^2q_2^2+q_0^2q_1^2) \\ 2(q_1^2q_3^2-q_0^2q_2^2) & 2(q_3^2q_2^2+q_0^2q_1^2) & q_0^2+q_3^2-q_1^2-q_2^2 \end{bmatrix} \quad [42]$$

The matrix defining the direction cosines of the mark of the mobile object M relative to the reference mark (mark of the platform $R_P$) is then computed using the expression:

$$R_{m/p}(t_{kg}) = R_{p/i}{}^t(t_{kg})\hat{R}_{g/i}(t_{kg})R_{g/m}{}^t \quad [43]$$

The second orientation may be defined by the Euler angles extracted from the matrix Rm/p $(t_{kg})$ using formulas known by the person skilled in the art.

The method makes it possible, on one hand, to provide at very high speed (in the order of 10 times faster) the estimation of the second orientation, which minimizes the delay between the provision of the information computed and the use thereof by the system that carries out the acquisition thereof at any periodicity and in a manner not synchronized with $t_n$, and, on the other hand, the compensation of the latency by the computation of the trajectory of $(t_{kg}-T_{obs}/2)$ at $t_{kg}$ thanks to the storing in memory and correction of the gyrometric speeds of $(t_{kg}-T_{obs}/2)$ at $t_{kg}$.

Applications

Applications of the invention are mainly those for which significant accuracy is necessary for the position and orientation of a body relative to another body taken for reference in the presence of strong electromagnetic disturbances. The position and orientation of the helmet of civilian and military aircraft pilots without using magnetic maps is a first application. Numerous applications in surgery, in simulators, capture of movements and video games, etc., are possible.

The invention claimed is:

1. A system for contactless determination of a position and orientation of a first mobile object (M) relative to a reference mark ($R_P$) carried by a second fixed or mobile object (P), in a disturbed electromagnetic environment, comprising:
   at least one electromagnetic sensor and at least one inertial sensor connected to the first mobile object;
   at least one transmitter comprising at least one transmitting antenna and at least one inertial unit including inertial sensors, the at least one transmitter connected to the second fixed or mobile object, the at least one transmitting antenna comprising ferromagnetic cores having effective relative magnetic permeability higher than 10, incorporating sensors for measuring a magnetic field $X_u$ actually emitted by axes of the ferromagnetic cores that provides variables for measuring an actual field emitted by the at least one transmitter;
   at least one reference electromagnetic sensor connected to the second fixed or mobile object; and
   a computer for determining an orientation and position of the first mobile object depending on signals provided by the sensors and inertial sensors.

2. The system according to claim 1,
   wherein the at least one transmitter is configured for transmitting magnetic induction(s), the at least one transmitting antenna including Ne transmitting coils having non-parallel axes of symmetry, the axes of symmetry forming a reference mark, wherein Ne is greater than or equal to 2;
   wherein the at least one electromagnetic sensor comprises Nc non-parallel receiving coils, the non-parallel receiving coils being sensitive to an ambient magnetic field resulting from a vector sum of fields emitted by the at least one transmitter and disturbing magnetic fields generated by electric currents existing in the disturbed electromagnetic environment and by ferromagnetic magnetizations, the at least one electromagnetic sensor forming a measurement mark, wherein Nc is greater than or equal to 2, wherein the product of Nc and Ne is greater than or equal to 6;
   wherein the computer is coupled to:
   a first analog/digital conversion means for carrying out acquisition of analog signals at discrete times $t_k=k*T_e$ and a second digital/analog conversion means for generating predetermined currents injected into the at least one transmitter;
   the transmitting antenna comprising the ferromagnetic cores having effective relative magnetic permeability higher than 10, incorporating the sensors for measuring the magnetic field $X_u$ actually emitted by the ferromagnetic cores that provide variables $X_u(j, t_k-k(i_c)T_e)$ for j=1 to Ne and $i_c$=1 to Nc; and
   means for extracting a signal correlated with a surrounding noise $X_{BR}(t_k-k_bT_e)$ from the sensors connected to the second fixed or mobile object in order to form with the magnetic field $X_u$ a complete model of the measured fields making it possible to extract, without disturbers, while demultiplexing channels emitted simultaneously, which makes it possible to compute the orientation and position of the first mobile object; and
   further comprising means for hybridization comprising:
   i) the at least one inertial sensor connected to the first mobile object and forming an inertial sub-assembly for IMU gyrometric measurements;
   ii) means for acquiring attitude information of an INS navigation unit connected to the second fixed or mobile object; and
   iii) a system for detecting magnetic tracker posture connected to the first mobile object and making it possible to cancel out the latency of the means for detecting position and for providing orientation information by computing the incorporation of a differential system governing the dynamics of the attitude of the object and that of sensor errors.

3. The system according to claim 2, wherein currents controlled by the computer are simultaneously emitted on three axes of symmetry of the Ne transmitting coils continuously or discontinuously according to a cyclical temporal pattern of duration $T_{obs}-T_{off}=N_{obs}\cdot T_e-T_{off}$, the computer estimates, continuously and in real time with an output recurrence frequency $F_{out}$ proportional to $$\frac{1}{T_{obs}}$$

equal or higher than the frequencies for refreshing video images, parameters of an analytical model of the vector sum of all of the fields present in the disturbed electromagnetic environment, the variables of the model being deduced:

from measurements taken by a third transmitting subassembly of the at least one transmitter providing the j signals $Xu_j(t_k)$ proportional to the emitted inductions, from the computation of variables of the type $X_u(j, t_k-k(i_c) T_e)$ the linear combination of which is the model of the disturbances correlated with the transmission flux, and from the estimation of the signal sum of the disturbances radiated from the disturbed electromagnetic environment $\hat{B}_{RM}(t_k)$ not correlated with the fields emitted by the coils of the at least one transmitter, and either from the measurements of the reference electromagnetic sensor or extracted from the measurements of the signal from the at least one electromagnetic sensor during the time $T_{off}$ for switching off the transmission.

4. The system according to claim 2, wherein the Ne transmitting coils are wound around a cubic or spherical ferromagnetic core comprising cylinders or parallelepipeds, a length-to-diameter or length-to-width ratio of which is higher than 10 and the magnetic permeability is higher than 2000, the cylinders or parallelepipeds being interlocked in a substantially identical manner according to three directions defined by the axes of symmetry of the coil windings and in such a way that a barycenter of the ferromagnetic core of each axis is as close as possible to a common center of the three coils.

5. The system according to claim 2, wherein a second orientation is computed in the following manner:

at times $t_k = k \cdot T_{obs}$, the quaternion $Q(t_k)$ defining the attitude of the at least one inertial sensor in a frame of the reference mark of the at least one transmitting antenna is computed from the terms of the matrices of direction cosines $$R_{g/i}^{EM}(t_k) = \hat{R}_{p/i}(t_k) \cdot R_{m/p}^{EM}(t_k) \cdot R_{g/m}$$

the quaternion $Q(t_{kg} = t_k + k_g \cdot T_g)$ obtained by digital incorporation of the equation $\dot{Q}(t_{kg})=$ $$Q(t_k) + \int_{t_k}^{t_{kg}=t_k+k_g \cdot T_g} \frac{A(\hat{\vec{\omega}}_m(u)) \cdot Q(u)}{2} du,$$

with $Q(t_k)$ being taken from the resetting of the state vector X of the type $X(t_n^+) = X(t_n^-) + K_n(Y-\hat{Y})$ during reception of the orientation $R_{m/p}^{EM}(t_k)$ giving the measurement where $$A(\hat{\vec{\omega}}_m(u)) = \begin{pmatrix} 0 & -\hat{\omega}_{mx}(u) & -\hat{\omega}_{my}(u) & -\hat{\omega}_{mz}(u) \\ \hat{\omega}_{mx}(u) & 0 & +\hat{\omega}_{mz}(u) & -\hat{\omega}_{my}(u) \\ \hat{\omega}_{my}(u) & -\hat{\omega}_{mz}(u) & 0 & \hat{\omega}_{mx}(u) \\ \hat{\omega}_{mz}(u) & \hat{\omega}_{my}(u) & -\hat{\omega}_{mx}(u) & 0 \end{pmatrix}$$

with $\vec{\omega} = \vec{\omega}_m - \vec{\delta\omega}$, calculated from the values $\vec{\omega}_m$ provided by the at least one inertial sensor and corrected of errors of the at least one inertial sensor $\vec{\delta\omega}$ estimated by an optimal estimator of the Kalman or sub-optimal type ("Least recursive squares" of the type LMS and RLS) according to a model for propagation of errors of the type $\vec{\delta\omega} = \vec{\omega}_b + K \cdot \vec{\omega}_m$ where $\vec{\omega}_b$ is a random bias and K the matrix of gain, misalignment and coupling errors between channels;

the direction cosine matrix $R_{g/i}(t_{kg})$ defining the attitude in a fixed mark provided by the at least one inertial unit is computed from the formula $$R_{g/i} = \begin{pmatrix} q_0^2 + q_1^2 - q_3^2 - q_4^2 & 2(q_1^2 q_2^2 - q_0^2 q_3^2) & 2(q_1^2 q_3^2 + q_0^2 q_2^2) \\ 2(q_1^2 q_2^2 + q_0^2 q_3^2) & q_0^2 + q_2^2 - q_3^2 - q_1^2 & 2(q_3^2 q_2^2 + q_0^2 q_1^2) \\ 2(q_1^2 q_3^2 - q_0^2 q_2^2) & 2(q_3^2 q_2^2 + q_0^2 q_1^2) & q_0^2 + q_3^2 - q_1^2 - q_2^2 \end{pmatrix}$$

where $Q(t_{kg}) = [q_0 \ q_1 \ q_2 \ q_3]^t$;

the second orientation provided at $t_{kg}$ is defined by the direction cosine matrix $R_{m/p}(t_{kg})$ defining the attitude of the first mobile object relative to the reference mark is then computed using the expression $$R_{m/p}(t_{kg}) = R_{p/i}{}^t(t_{kg}) \hat{R}_{p/i}(t_{kg}) R_{g/m}{}^t; \text{ and}$$

the second orientation being provided by the Euler angles extracted from the matrix $R_{m/p}(t_{kg})$.

6. The system according to 2, wherein the first mobile object comprises a helmet.

7. The system according to claim 3, wherein the parameters $A(i_c,j)$ of the analytical model determined relative to the terms $X_{U_j}(t_k)$ and to measurement axis $i_c$ of the at least one electromagnetic sensor provide the terms of the dipolar or multipolar model of the inductive magnetic fields from the terms of which the computer determines a first value of the position and orientation of the sensor attached to the first mobile object on each transmission cycle $T_{obs}$, the orientation defined by three Euler angles Yaw Y, Pitch P, and Roll R.

8. The system according to claim 3, wherein the predetermined currents injected through the Ne transmitting coils generate predetermined induction fluxes $F_j(t)$ characteristic of each axis of the coils and cycles of period $T_{obs}$, the value of which is close to periods for refreshing display screens, are such that the induction flux values continuously or discontinuously measured by the third transmitting subassembly and then digitized form temporal series that are not linearly dependent so as to form a reversible correlation matrix.

9. The system according to claim 3, wherein currents injected by the at least one transmitter result from a large loop gain control of a direct chain, a setpoint of which is a cyclical signal generated digital/analogue conversion means in the computer, the cyclical signal being of constant spectral density (Pseudo-Random Binary Sequence) or dependent on the frequency, and a return signal subtracted from the setpoint being proportional to the induction from the third transmitting sub-assembly.

10. The system according to claim 7, wherein variables defining the portion of the model linearly dependent on Ne fluxes $F_j(t)$ measured, j=1 to Ne, emitted by the Ne transmitting coils and received by the axis $i_c$ of the at least one electromagnetic sensor, comprises a linear combination of the type:

$$B_{CU/E}(i_c, t_k) \sum_{j=1}^{N_e} \sum_{k_{(i_c)}=0}^{N_{(i_c)}} A_{CU}(i_c, j, k_{i_c}) X_{CU}(j, t_k - k(i_c)Te)$$

with $$\vec{X_{CU}}(t_k - k_1 T_e) = [X_{U1}(t_k - k_1 T_e), X_{U2}(t_k - k_1 T_e), X_{U3}(t_k - k_1 T_e)]^t$$

in which the terms $A_C(i_c,j,k_i)$ for which $k_{ic}=0$ tend toward the values proportional to the inductive field that would be measured in free space in the absence of any magnetic disturbances, the other coefficients representing the values proportional to the inductions of the disturbing effects linearly dependent on the induction fluxes emitted.

11. The system according to claim 1, wherein a model of alternating signals of the environment of each component $i_c$ of the at least one electromagnetic sensor comprises a sum of signals of sinusoidal type $$B_{ESC}(i_c, t_k) = \sum_{k_{sc}=1}^{N_{sc}} \hat{C}_{SC}^{re}(i_c, k_{sc}) \cdot \cos(\omega_{k_{sc}} t k) + \hat{C}_{SC}^{im}(i_c, k_{sc}) \cdot \sin(\omega_{k_{sc}} t k)$$

the frequencies $\omega_{k_{sc}}$ of which are estimated during the periods of non-emission $T_{off}$ from the signals of the at least one electromagnetic sensor to form the variables Xsc of a model grouping the sum of the model $\hat{B}_{EC}(i_c, t_k)$ and of the model $B_{ESC}(i_c, t_k)$:

$$B_E = \sum_{j=1}^{N_e} \sum_{k_{i_c}=0}^{N_{i_c}} \hat{A}_C(i_c, j, k_{i_c}) \cdot X_C(i_c, j, k_{i_c}) +$$

-continued $$\sum_{k_{sc}=1}^{N_{sc}} \hat{C}_{SC}^{re}(i_c, k_{sc}) \cdot \cos(\omega_{k_{sc}} t_k) + \hat{C}_{SC}^{im}(i_c, k_{sc}) \cdot \sin(\omega_{k_{sc}} t_k).$$

12. The system according to claim 1, wherein a signal measured by the reference electromagnetic sensor $B_{Rm}(i_c,t_k)$ is filtered to obtain reference noise signal $\hat{B}_{Ebr}(i_c, t_k)$ by the following operations:

$$\hat{B}_{RM} = B_{C2} - \hat{B}_{CU} \text{ with}$$

$$\hat{B}_{RU}(i_c, t_k) = \sum_{j=1}^{N_e} \sum_{k_b=0}^{N_b} A_{BRC}(i_c, j, k_b) \cdot X_C(i_c, j, k_b).$$

* * * * *

UNITED STATES PATENT AND TRADEMARK OFFICE
CERTIFICATE OF CORRECTION

PATENT NO. : 10,132,636 B2
APPLICATION NO. : 15/034624
DATED : November 20, 2018
INVENTOR(S) : Jean-Louis Lescourret Page 1 of 1

It is certified that error appears in the above-identified patent and that said Letters Patent is hereby corrected as shown below:

In the Specification
Column 9, Line 48, change "the error c of" to --the error $\varepsilon$ of--
Column 11, Line 7, change "hamionics $B_{harmo}$" to --harmonics $B_{harmo}$--
Column 13, Line 45, change "$R_{JMj}$ is measured" to --$R_{IMj}$ is measured--

Signed and Sealed this
Twelfth Day of March, 2019

Andrei Iancu
*Director of the United States Patent and Trademark Office*